(12) United States Patent
Cudworth et al.

(10) Patent No.: US 11,241,110 B2
(45) Date of Patent: Feb. 8, 2022

(54) VALVE ASSEMBLY

(71) Applicant: Mayborn (UK) Limited, Newcastle upon Tyne (GB)

(72) Inventors: Nicholas Cudworth, Newcastle upon Tyne (GB); Anthony Jonathan Sanders, Newcastle upon Tyne (GB); Richard Parker, Newcastle upon Tyne (GB); Peter Angus, Newcastle upon Tyne (GB); Matthew O'Brien, Newcastle upon Tyne (GB); Kevin Crulley, Newcastle upon Tyne (GB)

(73) Assignee: Mayborn (UK) Limited, Newcastle Upon Tyne (GB)

( * ) Notice: Subject to any disclaimer, the term of this patent is extended or adjusted under 35 U.S.C. 154(b) by 31 days.

(21) Appl. No.: 16/616,404

(22) PCT Filed: May 23, 2018

(86) PCT No.: PCT/GB2018/051403
§ 371 (c)(1),
(2) Date: Nov. 22, 2019

(87) PCT Pub. No.: WO2018/215769
PCT Pub. Date: Nov. 29, 2018

(65) Prior Publication Data
US 2020/0154916 A1 May 21, 2020

(30) Foreign Application Priority Data
May 23, 2017 (GB) ...................................... 1708239

(51) Int. Cl.
*A47G 19/22* (2006.01)
*F16K 7/12* (2006.01)

(52) U.S. Cl.
CPC ............ *A47G 19/2272* (2013.01); *F16K 7/12* (2013.01)

(58) Field of Classification Search
CPC ............ A47G 19/2272; A47G 19/2266; A47G 19/2205; A47G 19/22; F16K 7/00; F16K 7/12

(Continued)

(56) References Cited

U.S. PATENT DOCUMENTS 1,254,251 A 1/1935 Magnus
3,360,161 A 12/1967 Smith
(Continued)

FOREIGN PATENT DOCUMENTS

CN 1882477 12/2006
CN 102006804 5/2012
(Continued)

OTHER PUBLICATIONS

PCT International Search Report and Written Opinion in International Application No. PCT/GB2018/051,403, dated Aug. 23, 2018, 15 pages.

(Continued)

*Primary Examiner* — Steven A. Reynolds
*Assistant Examiner* — Javier A Pagan
(74) *Attorney, Agent, or Firm* — Fish & Richardson P.C.

(57) ABSTRACT

The invention relates to a valve element (110, 310, 510, 601, 603) for allowing a user to drink from an upper rim (124, 324, 524) of a valve assembly (100, 300, 500, 600, 601) comprising a body (613) comprising a resiliently deformable portion (619) having a rim (621), the rim (621) located in a first plane, wherein at least the rim (621) of the resiliently deformable portion (619) is configured to deform substantially inwardly, to be located in a second plane, into a sealing position within a valve assembly (100, 300, 500, 600, 601), (Continued)

and further wherein a portion (629) of the rim (621) is configured to lift out of the second plane upon application of a suction force to an upper surface (639) of a corresponding portion (629) of the resiliently deformable portion (619). The invention also relates to a valve assembly (100, 300, 500, 600, 601) comprising a valve element (110, 310, 510, 601, 603) according to the invention.

20 Claims, 11 Drawing Sheets

(58) Field of Classification Search
USPC .......................... 220/714, 711, 703, 203.12
See application file for complete search history.

(56) References Cited

U.S. PATENT DOCUMENTS

| | | | |
|---|---|---|---|
| 5,540,350 A | 7/1996 | Lansky | |
| 5,890,620 A | 4/1999 | Belcastro | |
| 7,549,556 B2* | 6/2009 | Miller | A47G 19/2272 |
| | | | 137/853 |
| 7,575,126 B2 | 8/2009 | Kemper | |
| 8,025,178 B2* | 9/2011 | Miller | A47G 19/2272 |
| | | | 220/714 |
| 8,033,420 B2 | 10/2011 | Roseblade et al. | |
| 8,453,870 B2 | 6/2013 | Berg | |
| 9,241,588 B2 | 1/2016 | Dunn et al. | |
| 2006/0169694 A1 | 8/2006 | Roseblade et al. | |
| 2008/0156817 A1 | 7/2008 | Roseblade et al. | |
| 2011/0084084 A1* | 4/2011 | Berg | A47G 19/2272 |
| | | | 220/703 |
| 2012/0175378 A1 | 7/2012 | Hakim | |
| 2013/0233870 A1* | 9/2013 | Miller | A47G 19/22 |
| | | | 220/719 |
| 2015/0102032 A1* | 4/2015 | Dunn | A47G 19/2272 |
| | | | 220/231 |

FOREIGN PATENT DOCUMENTS

| | | |
|---|---|---|
| CN | 102459023 | 5/2012 |
| CN | 105246378 | 3/2017 |
| EP | 2848165 | 3/2015 |
| EP | 3381333 | 10/2018 |
| ES | 2531264 | 3/2015 |
| FR | 3025411 | 3/2016 |
| GB | 2401857 | 11/2004 |
| GB | 2482294 | 2/2012 |
| NO | 20081717 | 4/2008 |
| NO | 328413 | 2/2010 |
| WO | 2003061438 | 7/2003 |
| WO | 2009126042 | 10/2009 |
| WO | 2012007731 | 1/2012 |
| WO | 2018215769 | 11/2018 |

OTHER PUBLICATIONS

Office action issued in Great Britain Application No. 1808428.5 dated Nov. 15, 2018, 12 pages.
Extended European Search Report issued in European Application No. 19200220.2 dated Jan. 24, 2020, 7 pages.

* cited by examiner

VALVE ASSEMBLY

CROSS-REFERENCE TO RELATED APPLICATIONS

This application is a National Stage Application under 35 U.S.C. § 371 and claims the benefit of International Application No. PCT/GB2018/051403, filed on May 23, 2018, which claims priority to Great Britain Application Ser. No. 1708239.7, filed on May 23, 2017. The entire contents of the prior applications are considered part of and are incorporated by reference in this application.

This disclosure relates to a valve element and a valve assembly, and in particular relates to a valve element and a valve assembly suitable for a feeding and/or drinking vessel, such as an infant drinking cup. The disclosure generally relates to valve assemblies and valve elements which are suitable for allowing a user to drink from any point around a perimeter of an upper rim of a drinking vessel.

BACKGROUND

Cup assemblies for use by infants typically comprise a spout or nipple, and include a valve which can be opened via the application of negative pressure by suction on the spout or nipple by the infant. However, such a valve arrangement can have several disadvantages. Suction operated valves are often subject to leaks. Because the valve must be opened by the application of negative pressure by an infant, the valve must necessarily have a relatively small sealing force and can be easily inadvertently opened. For example, liquid can impact the valve member from within the cup and act to push the flexible part of the valve open, especially when the cup is vigorously shaken, inverted, or when the cup is accidentally dropped. Furthermore, the infant is restricted to drinking from the spout. This requires the infant to hold the cup in a certain orientation. The functionality offered by such a cup does not prepare the infant for using 'open ended' cups, from which the infant will be expected to drink as an adult.

It has been appreciated that a drinking cup assembly having a valve which is operated by direct contact pressure from the lips of an infant can mitigate some of the above detailed problems. This arrangement not only allows a stronger seal to be provided, but the arrangement can also be designed such that the infant can drink from any point around a rim of the cup. Known lip-openable valve assemblies tend to provide poor seals and/or can be difficult to actuate. Several known assemblies comprise numerous components, which are not easy to fit together, i.e. assemble and disassemble. Reducing the number of parts, and increasing the ease with which these parts fit together, improves the user's interactions with the valve assembly, as well as making the assembly simpler to clean.

Additional factors to consider include the ease and cost of manufacture. Known assemblies have several parts and utilise large, multi-material components. Reducing the number of components, as well as reducing the size and complexity of these components, results in a simple, lightweight and cost-effective valve assembly and/or element.

Further drinking cups are known that employ suction valves arranged around the annular lip of a drinking vessel. However, these arrangements often have to balance the ability to prevent leaks against the provision of a drinking cup that is easy to drink from. Hence, the known valves may react to low amounts of suction and be easy to drink from but may not be reliably leak-proof. Alternatively, if the vessels and valves are reliably leak-proof then they typically require significant suction to open the valve, in which case they are not easy to drink from. Some known valves, for example Berg U.S. Pat. No. 8,453,870, have attempted to address the above problem by constraining the flow of liquid from within the drinking vessel to the valve seal. However, whilst attempting to solve the above problem the drinking cup of Berg has limited or restricted the flow of liquid near the sealing surface/drinking location and thereby introduced another compromising feature.

The present invention seeks to address disadvantages encountered in the prior art by providing an improved valve assembly, and valve element, for a drinking cup.

SUMMARY

Aspects of the invention are set out in the independent claims. Dependent claims describe optional features.

According to an aspect, a valve assembly for allowing a user to drink from any point around an upper rim of a drinking vessel is provided. The valve assembly comprises a vessel flared surface, the flared surface flaring upwards and radially outwards toward the vessel upper rim. The valve assembly also comprises a valve element comprising a sealing cap and a cylindrical portion connected via connecting means, the connecting means comprising at least one aperture. The sealing cap comprises a flared portion, the flared portion flaring upwards and radially outwards to meet the flared surface to form a seal therewith.

The flared surface flares upwards and radially outwards toward the vessel upper rim, and may terminate at the vessel upper rim, and/or terminate to form the vessel upper rim. Reference is made to a flared surface of a vessel and a vessel upper rim, and it will be appreciated that this structure may be formed on an inner surface of a collar or other vessel component. In other words, the vessel may comprise multiple components, as is detailed below. The vessel upper rim may be the rim from which the user drinks and/or on which the user places their lower lip when drinking from the valve assembly.

The connecting means may take many structural forms, provided it can fulfil its function of connecting the annular cap and cylindrical portion of the valve element, and allow the flow of fluid therethrough. The connecting means may comprise a cylindrical connecting portion, which in turn may comprise at least one, or in some embodiments a plurality, of apertures. The connecting means may be an upper region of the cylindrical portion.

Optionally, the flared portion meets the flared portion of the vessel at, or adjacent to, the upper rim of the vessel.

The flared portion may meet an interior or inner surface of the vessel at or adjacent to the rim such that the user can apply suction and/or lip pressure to the vessel upper rim and/or the outer rim of the flared portion, and thereby cause the outer rim of the flared portion to deform and lift away from the flared surface. Thus, the user can open the valve by applying suction to the vessel upper rim and/or the outer rim of the flared portion.

Optionally, the flared surface comprises an annular valve seat surface, and the flared portion comprises an annular valve face.

Optionally, in a rest position of the valve assembly, the annular valve face is biased toward the valve seat surface.

A biasing force may be provided by flexible resilient material comprised in the flared portion. Alternatively or additionally, the flared portion and/or sealing cap may be sized such that, when the valve assembly is in an assembled state and the valve element is attached to and fixed inside the vessel, the outer rim of the flared portion presses into an inner surface of the vessel. Thus, a seal may be formed due to the relative sizes of the valve element and vessel.

Optionally, the sealing cap, connecting means and cylindrical portion form an integral valve element.

Optionally, the valve assembly comprises, and is configured to operate with, two components, the first component comprising the drinking vessel, and the second component comprising the integral valve element.

It will be appreciated that the provision of a valve assembly which can operate as a valve with two components, and in particular with only two components, are advantageous. Methods of manufacture can be improved as material costs can be reduced and the simplicity of manufacture can be increased. Users of the valve assembly can also more simply take apart and re-assembly the valve assembly, for example in order to clean the assembly or fill the vessel.

Optionally, the flared portion further comprises flexible, resilient material which, upon the application of suction to the outer rim of the flared portion, is configured to deform and lift from the flared surface to open the valve assembly.

Optionally, the resilient, flexible material is arranged such that, upon the application of suction and/or pressure from a user's lips at a particular point on the outer rim of the flared portion, the outer rim of the flared portion moves away from the vessel inner surface in the vicinity of the particular point, and remains sealed against the inner surface around the remainder of the circumference of the inner surface.

It will be appreciated that movement of the valve element only at, or only in the vicinity of, a location of the user's lips means that less material must be moved in order for the valve to open. Thus, the valve can be made more sensitive, and a user can therefore use less force and/or suction when opening the valve.

Optionally, the valve assembly is assembled, the valve element is arranged coaxially with, and fits inside, the vessel.

Optionally, a flare gradient of the flared portion of the valve element is greater than a flare gradient of the flared surface, such that the flared portion flares upwards and radially outwards to meet the flared surface to form a seal therewith.

Optionally, the attachment means comprises one of a screw thread, a bayonet fitting or a push-fit arrangement.

Optionally, the cylindrical portion comprises attachment means for removably attaching the valve element to the vessel.

Optionally, the flared surface is an inner surface of the vessel.

Optionally, the vessel comprises a collar component comprising the flared surface and the upper rim, and a lower component comprising an interior region for storing fluid. The collar component and lower component may be removably attachable to one another via attachment means.

Optionally, the valve assembly further comprises a vessel comprising the flared surface.

According to another aspect, there is provided a valve assembly for allowing a user to drink from any point on a perimeter of a rim of a drinking vessel. The valve assembly comprises:

a sealing member extending from an inner surface of the vessel, the sealing member comprising an annular valve face surface having an outer rim; and a valve element arranged to be removably fixed to the vessel and comprising an outer rim comprising a valve seat. When the valve element is fixed to the vessel: in a rest position, the annular valve face surface is configured to be biased toward the valve seat, and upon the application of pressure from a user's lips to the outer rim of the annular valve face surface, the annular valve face surface is arranged to move away from the valve seat, thus opening the valve.

Optionally, in the rest position, the annular valve face surface is biased toward the valve seat in a biasing direction, and upon the application of pressure from a user's lips to the outer rim of the annular valve face surface, the annular valve face surface is arranged to move away from the valve seat in a direction opposed to the biasing direction.

Optionally, the sealing member is arranged coaxially with, and is arranged to fit inside, the vessel.

Optionally, the valve element is arranged coaxially with, and is arranged to fit inside, the vessel and sealing member.

Optionally, the sealing member is fixed to an inner surface of the vessel, optionally around the circumference of the inner surface.

Optionally, the sealing member is integral with the vessel.

Optionally, the valve assembly is arranged to operate with two components, the first component comprising the vessel and the sealing member, and the second component comprising the valve element.

Optionally, the valve element is arranged to be removably fixed to the vessel via a screw fit arrangement, and a biasing force between the annular valve face surface and the valve seat can be adjusted by adjusting the screw fit.

Optionally, the valve face surface flares radially outward.

Optionally, the vessel rim flares radially outward. The vessel rim may also flare upwards, such that the vessel rim flares upwards and radially outwards.

Optionally, the annular valve face surface is arranged to move from the rest position and away from the valve seat upon the application of direct contact pressure from a user's lips to the outer rim of the annular valve face surface.

Optionally, the annular valve face surface is comprised of resiliently flexible material, and is biased against the valve seat due to the resilient nature of the material.

Optionally, the annular valve face surface extends substantially parallel to the vessel in the region of the upper rim of the vessel.

As will be described in further detail below, this provides a degree of protection to the annular valve face surface from forces which impact the outside of the vessel. This protection is particularly important when the valve face comprises flexible material.

Optionally, the annular valve face surface comprises resilient, flexible material and is arranged such that, upon the application of pressure from a user's lips at a particular point on the outer rim of the annular valve face surface, the annular valve face surface moves away from the valve seat in the vicinity of the particular point, and remains biased toward the valve seat around the remainder of its circumference.

Optionally, the vessel comprises a collar component comprising the sealing member; and a lower component comprising an interior region for storing fluid. The collar component and lower component may be removably attachable to one another via attachment means.

According to yet another aspect, there is provided a valve element of a valve assembly for allowing a user to drink from any point on a perimeter of a rim of a drinking vessel, the valve element comprising: an outer rim and an annular valve face. The annular valve face is located on a lower surface of the valve element and is arranged, when the valve element is attached to the drinking vessel and is in a rest position, to oppose a valve seat surface. The valve element also comprises at least one pivotal protrusion arranged on the lower surface of the valve element between the outer rim and annular valve face such that, upon the application of pressure from a user's lips to the outer rim, the at least one pivotal protrusion contacts the valve seat surface, and the annular valve face moves away from the valve seat surface via a pivoting movement around the at least one pivotal protrusion.

Optionally, the annular valve face and outer rim are integral and are comprised of resilient, flexible material.

Optionally, the annular valve face and outer rim are arranged such that, upon the application of pressure from a user's lips at a particular point on the outer rim, the annular valve face moves away from the valve seat surface in the vicinity of the particular point, and remains opposed to the valve seat around the remainder of its circumference.

Optionally, the valve seat surface is an inner surface of the vessel.

Optionally, the annular valve face is a rounded bead, rib or ridge, which is arranged to roll on the valve seat surface upon the application of pressure from a user's lips to the outer rim.

Optionally, the sealing cap is comprised at least in part of resilient and flexible material, and the annular valve face is biased against the valve seat due to the resilient nature of the material.

Optionally, the sealing cap is comprised at least in part of resilient and flexible material and of rigid plastic material.

Optionally, the valve element comprises a plurality of pivotal protrusions.

Optionally, the valve assembly is configured to operate with two components, the first component comprising the vessel, and the second component comprising the valve element.

The several advantages of a valve assembly which may operate as a valve with just components, and in particular with only two components, are set out herein.

Optionally, when the valve assembly is in a rest position, the annular valve face surface is biased toward the valve seat in a biasing direction. Upon the application of pressure from a user's lips to the outer rim of the annular valve face surface, the annular valve face surface is arranged to move away from the valve seat in a direction opposed to the biasing direction.

Optionally, the annular valve face surface comprises resilient, flexible material and is arranged such that, upon the application of pressure from a user's lips at a particular point on the outer rim of the annular valve face surface, the annular valve face surface moves away from the valve seat in the vicinity of the particular point, and remains biased toward the valve seat around the remainder of its circumference.

According to yet another aspect, a valve assembly is provided, the valve assembly comprising any valve element described herein attached to the drinking vessel.

Optionally, the drinking vessel comprises a collar component comprising an inner surface which forms, or which comprises, the valve seat surface; and a lower component comprising an interior region for storing fluid. The collar component and lower component may be removably attachable to one another via attachment means.

According to another aspect of the invention, a valve element for allowing a user to drink from an upper rim of a valve assembly comprises:

a body comprising a resiliently deformable portion having a rim, the rim located in a first plane, wherein at least the rim of the resiliently deformable portion is configured to deform substantially inwardly, to be located in a second plane, into a sealing position within a valve assembly, and further wherein a portion of the rim is configured to lift out of the second plane upon application of a suction force to an upper surface of a corresponding portion of the resiliently deformable portion.

In certain embodiments, the resiliently deformable portion is at an upper edge of the body. In this way, the resiliently deformable portion can be arranged to engage with the drinking vessel proximate the vessel lip and therefore can be easily accessible to users who drink from valve assemblies which employ such valve elements.

In certain embodiments, the body is substantially frustoconical. Advantageously, the arrangement provides optimum location of the resiliently deformable portion when the valve element is inserted into a drinking vessel thereby allowing easy access for the user's lips when drinking. More specifically, the frustoconical shape provides a recess that allows the user's top lip to seal against the body in a natural position and drink from the cup without it feeling awkward or unusual.

In certain embodiments the body comprises a baffle which comprises channels or openings configured to control flow of liquid to the resiliently deformable portion. The baffle may be fixed or connected to the body in any known manner, such as by fastener or by the inter-engagement of the baffle with the body via a push fit, or by moulding the baffle and body as a unitary part. In this way, when the valve element is inserted into the vessel, the baffle is configured to be between the main liquid held in the vessel and the resiliently deformable portion of the valve element. Consequently, if the valve assembly is knocked over or falls, the baffle is able to prevent the whole volume of liquid from hitting the lower surface of the resiliently deformable portion in a way that would otherwise cause the valve assembly to leak.

In certain embodiments, the channels or openings are located at the perimeter of the baffle. In this way, the channels are configured to allow liquid to easily flow through them when the body is inserted into a vessel to form a valve assembly and the user deliberately tilts the valve assembly to drink from it. Alternative configurations and shapes of the channels or openings which increase or reduce the space available for liquid to flow through may be selected as appropriate.

In certain embodiments, the baffle is rigid. The baffle is thus configured to attach the valve element to a vessel in such a way as to reliably locate the resiliently deformable rim at the desired vertical position on a vessel inner wall. Suitable rigid plastics material can be selected from the art and may include thermoplastic materials such as one of polypropylene PP, polycarbonate PC, polyphenylsulfone PPSU, glass-filled nylon, or similar material blends as appropriate.

In certain embodiments, at least the resiliently deformable portion of the valve element comprises an elastomer. Accordingly, the resiliently deformable portion can be deformed into different planes or can be made to fit within smaller diameters, such as to easily fit within a vessel or container. Suitable elastomers can be chosen from the art and may include one of silicone rubber, thermoplastic elastomer (TPE), ethylene propylene diene, styrene butadiene or polyurethane, or suitable blends as appropriate. Such materials allow the resiliently deformable portion to be soft enough to flex and still be self-supporting.

More specifically, the elastomer has a Shore A hardness in the range 40-60. Yet more specifically, the elastomer has a Shore A hardness in the range 50-55.

In certain embodiments, the resiliently deformable portion has a thickness dimension substantially between 0.6 mm and 1.2 mm. More specifically, the resiliently deformable portion has a thickness dimension of 0.9 mm. In a similar way to that described above, these thickness dimensions enable the resiliently deformable portion to be soft enough to flex and deform, and still be self-supporting.

In certain embodiments, the resiliently deformable portion has a lower surface, the lower surface comprising a sealing surface configured to provide a sealing abutment with an engagement surface of a drinking vessel. In this way, when the valve element is inserted into a vessel, it is able to form a leakproof seal capable of preventing liquid from escaping from a valve assembly, for example when the valve assembly is knocked over.

In certain embodiments, the rim of the resiliently deformable portion has an outer edge and when the rim is in the second plane, the outer edge is configured to sit above the sealing surface. In this way, the rim is configured to form a reliable sealing abutment but is sensitive to suction from the user's mouth. Thus, when the valve element is inserted into a vessel and the user places their lips around the vessel lip in order to take a drink, their lips easily contact and seal to the outer edge so that only a small suction force, akin to natural drinking, is sufficient to unseal the sealing abutment and thereby allow liquid out of the valve assembly.

More specifically, the sealing surface is annular. In this way, the valve element is configured to fit into a cylindrical vessel in any rotational orientation and is also configured to allow a user to drink from any point on the rim of a suitable valve assembly.

In certain embodiments, the rim of the resiliently deformable portion has a smaller outer diameter in the second plane than in the first plane. Thus, the rim is thereby configured to create a reliable seal as the valve element is inserted into a vessel. In other words, and without wishing to be bound by theory, when deformed from the first plane to the second plane, the rim is configured to act like a piston sealing within a cylinder so that the sealing abutment comprises more than just a "point seal" of two annular edges engaging or resting against one another and, instead, comprises two annular faces engaging one another.

More specifically, the outer diameter of the rim in the second plane is smaller than in the first plane by about 5 mm. Thus, the sealing abutment comprises two annular faces engaging one another in such a way as to provide a contact area of significant height. With a reduction in outer diameter of about 5 mm the sealing abutment may be substantially between 1 mm and 3 mm in height, thereby ensuring reliability in preventing leaks and greater resilience to ingress of contaminating particles that would otherwise impede it.

More specifically, the outer diameter of the rim in the first plane is substantially between 70 mm and 74 mm and the outer diameter of the rim in the second plane is substantially between 65 mm and 69 mm. Yet more specifically, the outer diameter of the rim in the first plane is about 72 mm and in the second plane is about 67 mm. In this way, the valve element is configured to fit within vessels sized appropriately for children or infants and with a sealing abutment appropriately sensitive to their drinking action.

In certain embodiments, in the first plane the rim is at an angle 30-45° to the horizontal and in the second plane the rim is deformed to an angle 70-90° to the horizontal. More specifically, in the first plane, the rim is angled at an angle of substantially 38° to the horizontal and in the second plane the rim is deformed to an angle of substantially 90°. In this way, the valve element is configured to provide a central depression which provides space for the user's upper lip and nose in order that they are able to drink from the valve assembly in a natural manner. The inward angular deformation of the rim also ensures the resiliently deformable portion is configured to form a reliable sealing abutment with an engagement surface of a vessel to prevent leaks from the vessel. In other words, the angular deformation of the rim is such that it is able to provide a sealing force to resist internal pressure and impact from liquid moving within valve assembly and the seal is substantially more effective than if the rim were simply resting or engaging a vessel lip.

According to an aspect there is provided a valve assembly comprising a valve element of the preceding aspect of the invention.

According to a further aspect of the invention, a valve assembly is provided comprising:
  a vessel for receiving a liquid comprising a lip and an inner wall, and a valve element comprising a body comprising a resiliently deformable portion having a rim, the rim located in a first plane, wherein at least the rim of the resiliently deformable portion is deformed substantially inwardly into a second plane, so as to be located within the vessel inner wall, and further wherein a portion of the rim is lifted out of the second plane upon application of a suction force to an upper surface of a corresponding portion of the resiliently deformable portion.

In certain embodiments, the inner wall of the vessel comprises an engagement surface.

In certain embodiments the resiliently deformable portion has a lower surface, the lower surface comprising a sealing surface, such that when the rim is in the second plane, the sealing surface provides a sealing abutment with the engagement surface. In this way, the valve element is able to form a leakproof seal within a vessel that is capable of preventing liquid from escaping from a valve assembly, for example when the valve assembly is knocked over.

More specifically, the resiliently deformable portion has an outer edge such that when the rim is in the second plane the outer edge is located not lower than the vessel lip. In this way, when the user drinks from the valve assembly, their mouth seals easily onto the upper surface of a portion of the resiliently deformable portion. As such, the user finds it easy to drink from the valve assembly with a natural drinking action and does not have to alter the angle of the valve assembly in their mouth or how far into their mouth they place the lip in order to unseal a portion of the rim and drink easily. In particular, for infants and young children who are learning to drink from an open cup, the arrangement allows them to learn a "grown-up" drinking style without accidental spills.

According to a further aspect, a valve assembly is provided comprising:
  a vessel for receiving a liquid comprising a lip and an inner wall having a first diameter, and a valve element comprising:
  a body comprising a resiliently deformable portion having a rim, the rim extending outwardly to a second diameter, wherein the second diameter is larger than the first diameter, wherein at least the rim of the resiliently deformable portion is deformed substantially inwardly to be located within the vessel inner wall, and further wherein a portion of the rim is lifted upon application of a suction force to an upper surface of a corresponding portion of the resiliently deformable portion.

In certain embodiments, the inner wall of the vessel comprises an engagement surface and a lower surface of the rim comprises a sealing surface. More specifically, the sealing surface provides a sealing abutment with the engagement surface when at least the rim of the resiliently deformable portion is deformed substantially inwardly. In this way, the sealing surface and engagement surface are configured to create a reliable sealing abutment. In other words, the rim is configured to act like a piston sealing within a cylinder so that the sealing abutment comprises more than just a "point seal" of two annular edges engaging or resting against one another and instead comprises two annular faces engaging one another.

In certain embodiments, the rim of the resiliently deformable portion has an outer edge. More specifically, the outer edge is not lower than the vessel lip when at least the rim of the resiliently deformable portion is deformed substantially inwardly. In this way, when the user drinks from the valve assembly, their mouth seals easily onto the upper surface of a portion of the resiliently deformable portion and is able to drink from the valve assembly with a natural drinking action and position. Furthermore, infants and young children who are learning to drink from an open cup are able to learn a "grown-up" drinking style without accidental spills.

In certain embodiments, the sealing abutment extends for a distance of 1-3 mm down the inner wall of the vessel. Thus, the sealing abutment has a vertical height dimension that improves reliability in preventing leaks and resilience to ingress of contaminating particles that would otherwise impede it.

In certain embodiments, the engagement surface is proximate the lip of the vessel. In this way, the vessel capacity is maximised and the user's mouth can easily contact and apply a suction force to activate the valve assembly.

In certain embodiments, at least one of the sealing surface and the engagement surface is textured. In this way, it is possible to modify or control the friction between the two surfaces in order to moderate both the resistance to inserting the valve assembly into the vessel, as well as the ease with which portions of the abutment unseal when the user drinks from the valve assembly.

In certain embodiments, the valve element and/or the vessel comprise attachment means for removably attaching to one another. Such attachment means are known in the art and allow the user to easily assemble the valve assembly and to easily take the valve assembly apart for cleaning or to replace worn or damaged parts.

In certain embodiments, the vessel is dimensioned to receive the valve element entirely within the diameter of the inner wall. This enables the rim of the valve element to act as piston when received into the vessel and to ensure the sealing abutment is more than a point seal. This arrangement also ensures that the valve element cannot overhang the lip of the vessel such that the sealing abutment cannot be unsealed by accidentally lifting or moving the rim of the valve element.

In certain embodiments the vessel is substantially cylindrical. In this way, the valve element may be configured so that it fits into a cylindrical vessel in any rotational orientation. Furthermore, the vessel is thereby configured to allow a user to drink from any point on the rim of valve assembly.

According to a further aspect of the invention, a method of drinking from a valve assembly is provided. The method comprises:

providing a vessel with an inner wall with a first diameter, providing a valve element, said valve element comprising a body comprising a resiliently deformable portion having a rim, the rim extending outwardly to a second diameter, wherein the second diameter is larger than the first diameter, inserting said valve element into the vessel such that at least the rim of the resiliently deformable portion is deformed substantially inwardly to locate within the vessel inner wall into a sealing position, applying a suction force to a portion of an upper surface of the resiliently deformable portion so as to lift a corresponding portion of the rim to allow liquid to flow out of the valve assembly.

According to a further aspect of the invention, a method of drinking from a valve assembly is provided. The method comprises:

providing a vessel with an inner wall with a first diameter, providing a valve element, said valve element comprising a body comprising a resiliently deformable portion having a rim, the rim extending outwardly to a second diameter, wherein the second diameter is larger than the first diameter, inserting said valve element into the vessel such that at least the rim of the resiliently deformable portion is deformed substantially inwardly to locate within the vessel inner wall into a sealing position, wherein the valve assembly is configured such that applying a suction force to a portion of an upper surface of the resiliently deformable portion lifts a corresponding portion of the rim to allow liquid to flow out of the valve assembly.

In certain embodiments, the rim comprises an outer edge and the vessel comprises a lip. More specifically, in the sealing position, the outer edge of the rim is not lower than the lip. In this way, when the user drinks from the valve assembly, their mouth may seal easily against the upper surface of a portion of the resiliently deformable portion so that they are able to drink from the valve assembly with a natural drinking action and position.

In a further embodiment, the valve element further comprises a baffle. More specifically, upon applying a suction force, the baffle restricts or controls the liquid flowing out of the valve assembly. Consequently, if the valve assembly is knocked over or falls, the baffle is able to prevent the whole volume of liquid from hitting lower the surface of the resiliently deformable portion in a way that would otherwise cause the valve assembly to leak.

According to yet another aspect, a valve assembly or valve element is provided which is substantially as described and disclosed herein, with reference to the description and drawings.

According to yet another aspect, a computer readable medium is provided, which has data stored thereon which is representative of the valve assembly or valve element of any preceding claim, the data being such that it can be relayed to an additive manufacturing device to enable the additive manufacturing device to fabricate the valve assembly based on the data.

FIGURES

Specific embodiments are now described, by way of example only, with reference to the drawings, in which:

FIG. 1 depicts a cross section of a valve assembly in accordance with a first embodiment.

FIGS. 2*a-c* depict close up cross sections of the valve assembly of the first embodiment. In particular, FIG. 2*a* depicts part of the valve assembly in a rest, i.e. closed, position. FIG. 2b depicts the application of pressure to the valve, for example from the lips of an infant or other user of the valve assembly. FIG. 2c depicts the valve assembly in an open position/arrangement, and shows a potential fluid flow path from inside the cup to outside the cup or vessel.

FIG. 3 depicts a cross section of a valve assembly in accordance with a second embodiment.

FIGS. 4a-c depict close up cross sections of the valve assembly of the second embodiment. In particular, FIG. 4a depicts part of the valve assembly in a rest, i.e. closed, position. FIG. 4b depicts the application of pressure to the valve, for example from the lips of an infant or other user of the valve assembly. FIG. 4c depicts the valve assembly in an open position/arrangement, and shows a potential fluid flow path from inside the cup to outside the cup.

DETAILED DESCRIPTION

Figure 1:
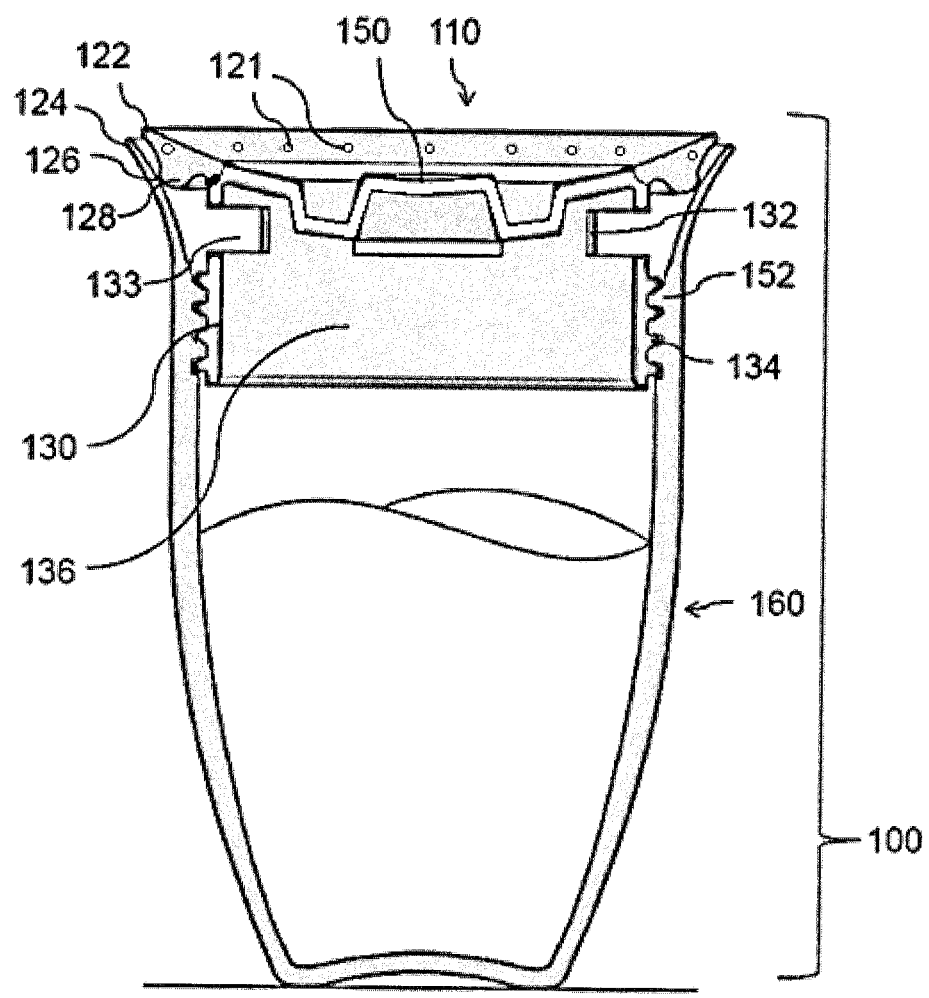

FIG. 1 depicts a cross-section of a valve assembly 100 in accordance with a first embodiment of the present disclosure. The valve assembly 100 comprises a feeding and/or drinking vessel 160 and a valve element 110, the valve element 110 in turn comprising a sealing cap 150 and a cylindrical portion 130.

When the valve element 110 is attached to the vessel 160, as shown in FIG. 1, the valve assembly 100 is formed. The valve assembly 100 in the embodiment shown comprises both the vessel 160 and the valve element 110. The valve element 110 can be removably attached to the feeding and/or drinking vessel 160 via attachment means. In the arrangement shown in FIG. 1, the cylindrical portion 130 has a threaded portion 134 on an outer/external surface, which allows the valve element 110 to be removably fixed to the vessel 160 via interaction with an internally threaded portion 152 of the vessel 160. The internally threaded portion 152 of the vessel 160 and the externally threaded portion 134 of the cylindrical portion 130 together comprise the attachment means. A screw fit arrangement is formed between the threaded portions. The screw fit provides a water-tight seal between the valve element 110 and the vessel 160. It will be appreciated that other suitable attachment means may be used to attach the valve element 110 to the vessel 160, for example a bayonet attachment means or a push-fit arrangement.

The sealing cap 150 comprises an upper face and has an outer rim 122. The sealing cap 150 is bowed, or flared, in cross section. In other words, the upper face curves upwards from a central, relatively flat lowermost surface toward the outer rim 122 of the sealing cap 150. In still other words, the upper face can be described as roughly dome-shaped.

The sealing cap 150 is connected to the cylindrical portion 130 by connecting means. The connecting means allows the passage of fluid therethrough. The cylindrical portion 130 is at least partially hollow to form a cylindrical hollow region 136. Fluid may thus flow and be stored inside the cylindrical portion 130.

The connecting means comprises a connecting portion 132. The connecting portion 132 extends from the sealing cap 150 to the cylindrical portion 130. The connecting portion 132 is fixedly attached to an underside of the sealing cap 150. The connecting portion 132 may be hollow and cylindrical, and/or may flare radially outwards or radially inwards from the cylindrical portion 130 to meet the underside of the sealing cap 150. The cylindrical walls of the connecting portion 132 may align with the cylindrical walls of the cylindrical portion 130. The connecting portion 132 comprises at least one aperture 133, and in some embodiments comprises a plurality of apertures 133. The plurality of apertures 133 may be arranged in a ring around the circumference of the connecting portion 132. The cylindrical hollow region 136 located inside the cylindrical portion 130 and the apertures 133 of the connecting means allow the formation of a fluid flow path, as will be discussed in detail below. In some embodiments, the connecting means/connecting portion 132 comprises two regions of apertures or gaps (not shown in FIG. 1), one apertured region located at or adjacent to an upper region of the connecting portion 132 and another apertured region located at, adjacent to and/or directly above the screw thread 134.

In more detail, the first apertured region comprises apertures in the connecting portion 132, the apertures being located/positioned adjacent to the underside of the sealing cap 150. These apertures may be a ring of apertures formed adjacent to the underside of the sealing cap 150. The apertures in the first apertured region may be either located/positioned solely in the region adjacent to the sealing cap 150, or may extend in an axial direction downwards and away from the upper face of the connecting portion 132. In other words, the apertures may extend downward from the section of the connecting portion 132 which meets the underside of the sealing cap 150. Because apertures are positioned in an upper region of the connecting portion 132, e.g. a region adjacent to the underside of the sealing cap 150, when the vessel 160 is tipped up, a greater amount of liquid can flow through the apertures, and less residual liquid will be trapped in the vessel 160. In other words, less liquid can pool inside the connecting means because apertures are located at an uppermost point of the connecting means.

The second apertured region is located at or adjacent to the screw thread 134. The second apertured region comprises apertures which are located at, adjacent to or directly above the screw thread. Because the apertures are located adjacent to, or at, the screw thread, less liquid can be trapped in the region defined by the upper inner wall of the vessel 160 and an outer wall of the connecting portion 132, for example when the vessel 160 is inverted and then returned to an upright orientation.

In the embodiment of FIG. 1, the connecting means/connecting portion is an upper region of the cylindrical portion 130. In this embodiment, a lower region of the cylindrical portion 130 comprises a screw thread, an upper region of the cylindrical portion 130 comprises an aperture 133 or plurality of apertures 133 therein, and the upper region of the cylindrical portion 130 fixedly joins, attaches to, and/or is integral with an underside of the sealing cap 150.

The sealing cap 150 has an annular lower surface. The annular lower surface can be described as an inner surface, as it faces the inside of the cup or vessel 160 when attached to the cup or vessel 160. An annular valve face 128 is formed on the lower, or inner, surface of the sealing cap 150. The annular valve face 128 is in the form of an annular bead, rib or ridge, which extends from the annular lower surface of the sealing cap 150 around the entire circumference of the annular lower surface of the sealing cap 150. The annular valve face 128 is preferably rounded on its outer surface, i.e. on the surface which faces the valve seat surface 126 as will be described in detail below.

At least one pivotal protrusion 121 also extends from the lower surface of the sealing cap 150. In the embodiment of FIG. 1, a plurality of pivotal protrusions 121 extends from the lower surface of the sealing cap 150 at locations around the annular lower surface. The pivotal protrusions 121 may be equally spaced, roughly equally spaced, or placed at irregular intervals around the lower surface of the sealing cap 150. The pivotal protrusions 121 may be protrusions, projections, and/or extensions, and may take the form of circular protrusions, elongated ridges or ribs, or may be of any other shape or form which allows them to fulfil their function of acting as a pivot, which will be described in detail below. The pivotal protrusions 121 are arranged at locations radially outward from the annular valve face 128, but radially inward from the cap outer rim 122. As the sealing cap 150 forms part of the valve element 110, the arrangement can be described as follows: the at least one pivotal protrusion 121 is arranged on a lower surface of the valve element 110, in between an outer rim 122 of the valve element 110 and an annular valve face 128 of the valve element 110. In still other words, the at least one pivotal protrusion 121 and the annular valve face 128 are arranged on a common surface of the valve element 110, and that surface terminates at an outer rim 122.

The vessel 160 may be a relatively standard drinking vessel 160, having an upper rim 124 and means for removably attaching or fixing the valve element 110 thereto, such as a screw fit arrangement as described above. The vessel 160 also comprises a valve seat surface 126 on an inside surface of the vessel 160. The vessel 160 flares outwards in its upper region and toward its upper rim 124, so that the diameter of the vessel 160 generally increases from an upper region of the vessel 160 toward the vessel upper rim 124. The inner surface of the vessel 160 in the vicinity of the upper rim 124 forms a flared surface 135. The flared surface 135 is generally annular and flares upwards and radially outwards, and terminates to form the vessel upper rim 124. In its simplest form, as shown in FIG. 1, the valve seat surface 126 may simply be the inside surface of the vessel 160 in the region of the vessel upper rim 124. In other words, the valve seat surface 126 may be formed on the flared surface 135. In this manner, the valve seat surface 126 is located on an inner surface of an outwardly flared portion of the vessel upper rim 124. The region of the inside surface of the vessel 160 which acts as a valve seat is annular or cylindrical in shape, and comprises the region of the inside surface of the vessel 160 which contacts the valve element 110's annular valve face 128 when the valve element 110 is attached to the vessel 160. In other embodiments, the valve seat surface 126 may be an annular flange, rim or similar structure which extends from an inside surface of the vessel 160.

The components of the valve assembly 100 can be formed in any appropriate manner, for example compression or injection moulding. Suitable manufacturing techniques include forming the components in two-step processes such as co-moulding or over-moulding. The constituent pieces of the valve assembly 100 can be formed of any appropriate plastics material. The vessel 160/cup can be formed of any appropriate rigid plastics material, such as thermoplastic materials such as polypropylene PP, polycarbonate PC or similar material blends as appropriate. The sealing cap 150 can be formed, at least in part, from any appropriate resilient, flexible material such as silicone, latex or a thermoplastic elastomer (TPE). In the embodiment shown in FIG. 1, the sealing cap 150 is formed of a rigid plastic in the centre of the upper face, while the outer rim 122, pivotal protrusions 121 and annular valve face 128 are formed of a soft resilient material. Such a sealing cap 150 structure gives structural integrity to the valve assembly 100 while allowing for a soft surface which contacts the user's lips. The resilient nature of the material also provides a biasing effect and ensures that the valve remains closed in a rest position, as will be discussed in further detail below.

Figures 2A, 2B:
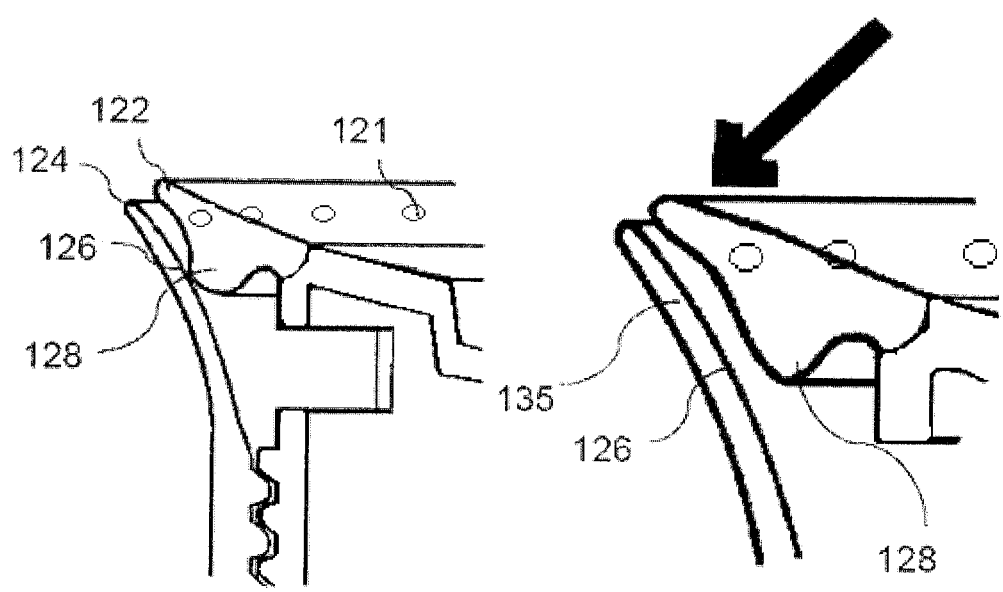

Turning to the operation of the valve assembly 100, when no force acts on the valve assembly 100, for example no force acts on the sealing cap 150 from a user's lips, then the valve assembly 100 is in a rest position. The rest position is shown in FIG. 2a. In the rest position, the annular valve face 128 of the sealing member opposes, in other words faces, abuts and/or contacts, the annular valve seat surface 126 of the vessel 160. The resilient nature of the sealing cap 150 material, at least in the vicinity of the annular valve face 128, ensures that the annular valve face 128 is biased toward the annular valve seat surface 126. In other words, the annular valve face 128 contacts and presses against the valve seat surface 126 to form a seal therebetween. In more general terms, a seal is formed between the vessel 160 and the valve element 110 such that no fluid flow path can be formed from the inside of the vessel 160 to the outside of the vessel 160.

Figure 2C:
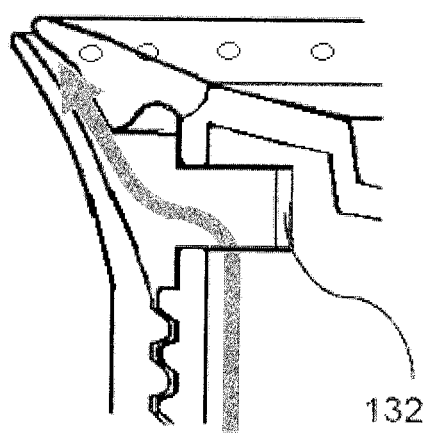

When a user presses his or her lips to the outer rim 122 of the valve element 110/sealing cap 150 as shown in FIG. 2b, the sealing cap 150 is actuated and the valve opens, forming a fluid flow path from inside the vessel 160 to the user's mouth. The valve assembly 100 is shown in an open position in FIG. 2c, along with a possible fluid flow path which may be formed. In more detail, when a user presses his or her lips to the outer rim 122 and hence imparts a downward pressure or force to the outer rim 122, the sealing cap 150 flexes in the vicinity of the applied force/pressure such that the annular valve face 128 moves away from the annular valve seat surface 126 via a pivoting movement around those pivotal protrusions 121 which are located in the vicinity of the applied pressure/force. In this manner, the pivotal protrusions 121 act as pivoting points which allow the valve to open upon the application of contact pressure from a user's lips. In other words, the downward force applied to the outer rim 122 of the sealing cap 150 by a user is converted into an upward movement of the annular valve face 128, thus lifting the annular valve face 128 from the annular valve seat surface 126 and unsealing the vessel 160.

In some embodiments, the pivotal protrusions 121 do not contact the vessel 160 in the rest position. In other embodiments, the pivotal protrusions 121 do contact the vessel 160 in the rest position. In either case, it will be appreciated that the pivotal protrusions 121 may still act as pivoting points upon the application of force/pressure to the outer rim 122 as described above.

In embodiments in which the annular valve face 128 has a rounded outer edge, an additional rolling effect makes the valve easier to operate and open, and hence allows the valve to be more sensitive. Upon the application of a user's lip pressure to the outer rim 122, the outer region of the sealing cap 150 flexes and rolls about the rounded edge of the annular valve face 128 as the annular valve face 128 contacts the valve seat surface 126/vessel inner surface.

When the user wishes to drink from the vessel 160, the valve assembly 100, comprising the vessel 160 and valve element 110, is tilted or upended. Liquid in the vessel 160 acts under gravity to pass through the hollow region 136 of the cylindrical portion 130 and through the apertures or gaps in the connecting means. When the user applies pressure to the outer rim 122 of the sealing cap 150, as described above the annular valve face 128 is lifted from the annular valve seat surface 126 via a pivoting movement centred on at least one pivotal protrusion, thus opening the valve in the vicinity of the user's lip pressure. A fluid flow path is thus formed from inside the vessel 160 to the user's mouth via the hollow cylindrical region, through the apertures or gaps in the connecting means, and between the valve face 128 and valve seat surface 126. This fluid flow path is shown in part in FIG. 2c.

Lip pressure on a particular point on the cap outer rim 122 opens the valve in the vicinity of that particular point. In other words, the lip pressure causes movement of the annular valve face 128 in a region local to the lip pressure. In some embodiments, lip pressure causes movement of the annular valve face 128 only in a region local to the lip pressure, while the seal is maintained around the remainder of the annular valve face 128 circumference.

Due to the resilient nature of the material comprised in the sealing cap 150, a biasing force is provided between the annular valve face 128 and the annular valve seat surface 126. This force acts to press the annular valve face 128 against the annular valve seat surface 126. Due to the resilient nature of the material comprised in the sealing cap 150 and the biasing force, once the user's lip pressure is removed the annular valve face 128 is again moved back toward the annular valve seat surface 126, and the valve assembly 100 moves back into the rest position in which the fluid flow path is blocked.

It will be understood that the above description of a specific embodiment is by way of example only and is not intended to limit the scope of the present disclosure. Many modifications of the first embodiment are envisaged and intended to be within the scope of the present disclosure.

For example, it has been appreciated that the pivotal protrusions 121 may be located on the inner surface of the vessel 160. Similarly, pivotal protrusions 121 may be arranged on both the inner surface of the vessel 160 and also on the annular lower surface of the sealing cap 150. These embodiments operate in a similar manner to embodiment shown in FIG. 1. When a user presses down on the outer rim 122, the pivotal protrusions 121 of the vessel 160 contact the lower surface of the sealing cap 150 at a contact region which is located between the outer rim 122 and the annular valve face 128. In this manner, the pivotal protrusions 121 can actuate the sealing cap 150 and effect a pivoting movement in a manner similar to that described above.

FIGS. 3 and 4a-c show a second embodiment of a valve assembly 300 in accordance with the present disclosure. The skilled person will appreciate that there are similarities between the first and second embodiments, and descriptions given above for components of the first embodiment generally apply also to the components of the second embodiment except where explicitly stated below. Like-reference numerals are used to depict like-components in the figures.

Figure 3:
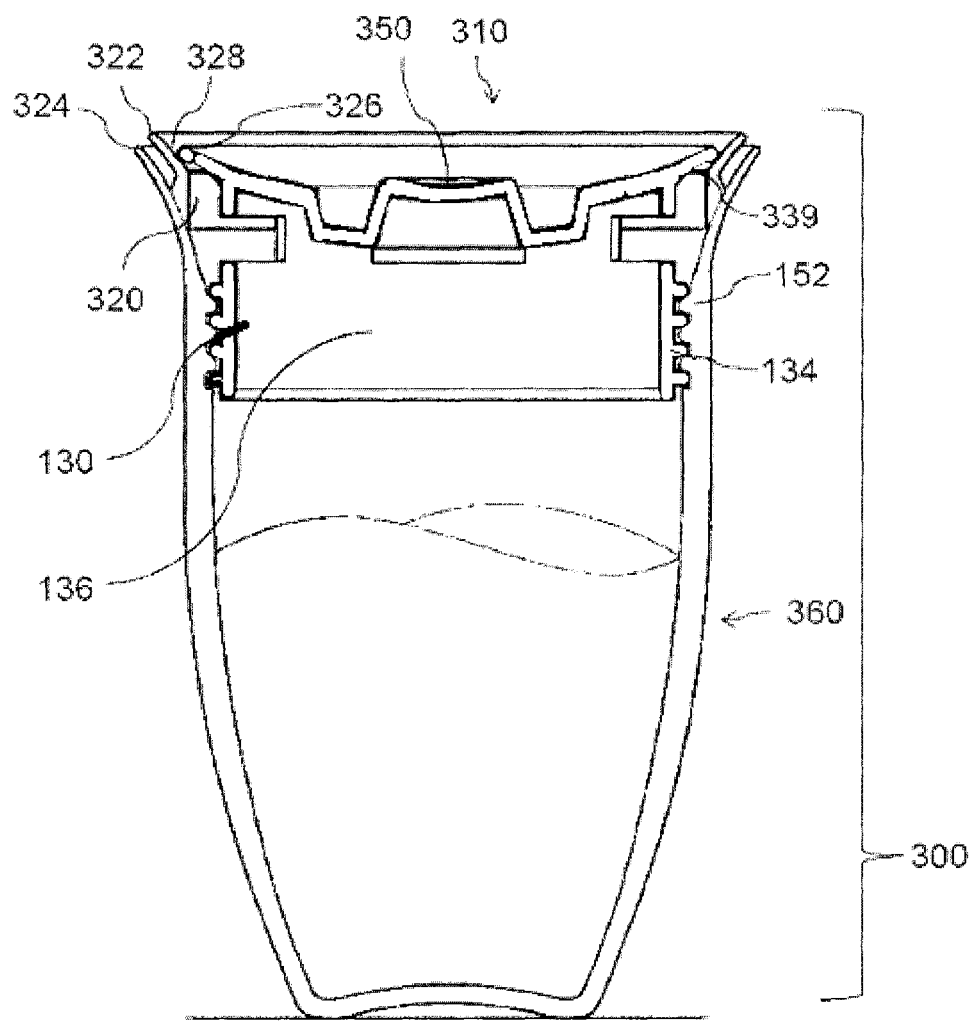

FIG. 3 depicts a cross-section of a valve assembly 300. The valve assembly 300 is formed from a valve element 310 and a vessel 360. As with the first embodiment, the valve element 310 comprises a sealing cap 350 and a cylindrical portion 130. The cylindrical portion 130 has a hollow interior portion 136 and is connected to the sealing cap 350 via connecting means in a manner similar to the first embodiment. As with embodiment 1, the vessel 360 comprises an upper rim 324, a flared surface 335, and an interior region for storing liquid.

In the second embodiment, the vessel 360 has a sealing member 320. The sealing member 320 is an insert which fits inside the vessel 360. The sealing member 320 is coaxial with, and fits inside, the vessel 360. The sealing member 320 extends from an inner surface of the vessel 360. In more detail, the sealing member extends from the flared surface 335 of the vessel 360. The sealing member 320 has an outer rim 322, a valve face surface 328, and is fixed to the vessel 360. In some embodiments the sealing member 320 is removably fixed to the vessel 360, and in other embodiments the sealing member 320 is integral with the vessel 360. In the embodiment shown in the figures, the sealing member 320 is integral with the vessel 360, being co-moulded to a top region of an inner wall of the vessel 360.

As described above in relation to the first embodiment, the vessel 360 flares outwards in its upper region, so that the diameter of the vessel 360 generally increases from an upper region of the vessel 360 toward the vessel upper rim 324. As shown in FIG. 3, the sealing member 320, and hence the valve face surface 328, is located adjacent to and inside the flared top region of the vessel 360 in the vicinity of the vessel upper rim 324. In other words, the valve face surface 328 is located adjacent to, and radially inwards from, an inner surface of an outwardly flared portion of the vessel upper rim 324.

As will be appreciated by the skilled person, provided that the sealing member 320 comprises a valve face surface 328 which allows the functionality described below, the sealing member 320 can take numerous forms. The particular sealing member 320 shown in FIG. 3 has two main elements: the first extending upwardly from an inner surface of the vessel 360 and the second extending upwardly and radially outwardly from the first element. The second element extends upwardly from the first element and terminates to form an outer rim 322 of the sealing member 320. In other words, the sealing member 320 comprises a flared portion which flares upwards and radially outwards, and the flared portion of the sealing member 320 extends parallel with and adjacent to the flared portion of the vessel 360. The radially inner surface of the second element, i.e. the inner surface of the outwardly and upwardly flared portion of the sealing member 320, forms a valve face surface 328. It will therefore be appreciated that the outer rim 322 of the sealing member 320 is also the outer rim 322 of the annular valve face surface 328. The upper rim 324 of the vessel 360 and the outer rim 322 of the sealing member 320 are located adjacent and/or next to each other such that a user can use his lips to press the outer rim 322 of the sealing member 320 toward the vessel upper rim 324, as will be described in more detail below.

The valve element 310 is generally shaped and structured in the manner described above in relation to the first embodiment. The upper face of the sealing cap 350 extends radially outward and upward toward the outer rim 322 of the sealing cap 350. However, in the second embodiment, the lower surface 339 of the sealing cap 350 forms an annular valve seat 326 surface, and in particular a lower surface of the outer rim 322 of the sealing cap 350 forms an annular valve seat 326 surface. In other words, the valve element 310 has an outer rim 322 which comprises a valve seat 326.

The pivotal protrusions 121 and the annular valve face described above in relation to the first embodiment are not necessarily required. However, it will be appreciated that a valve assembly 300 which comprises the sealing member of the second embodiment and the valve element 110 of the first embodiment is an effective valve assembly 300 which benefits from the advantages described in relation to both embodiments.

As with the valve assembly 300 of the first embodiment, the components of the valve assembly 300 of the second embodiment can be formed in any appropriate manner, for example compression or injection moulding. Suitable manufacturing techniques include forming the components in two-step processes such as co-moulding or over-moulding. The sealing cap 350 of the second embodiment may comprise a resilient, flexible material such as silicone, latex or a thermoplastic elastomer (TPE). However, in the embodiment shown in FIG. 3, the sealing cap 350 is formed entirely of a rigid plastic material. Such a sealing cap 350 structure gives structural integrity to the valve assembly 300. At least the element of the sealing member 320 which forms the annular valve face surface 328 may be comprised of a resilient flexible material. Alternatively, all of the sealing member 320 may be formed of such a material. The resilient nature of the material provides a biasing effect and ensures that the valve remains closed in a rest position, as will be discussed in further detail below.

Turning to the operation of the valve assembly 300 of the second embodiment, when the valve element 310 is screwed down onto the vessel 360, an inner, lower surface 339 of the sealing cap 350 presses against the annular valve face of the sealing member 320. As the sealing cap 350 is screwed down, a seal is formed between the annular valve seat 326 surface of the sealing cap 350 and the annular valve face surface 328 of the sealing member 320. Due to the resilient nature of the material forming the annular valve face surface 328, the annular valve face surface 328 is biased toward and against the valve seat 326 surface. In other words, the annular valve face surface 328 contacts and presses against the valve seat 326 surface to form a seal therebetween. In more general terms, a seal is formed between the sealing member/vessel 360 and the sealing cap 350 such that no fluid flow path can be formed from the inside the vessel 360 to the outside of the vessel 360.

Figure 4A:
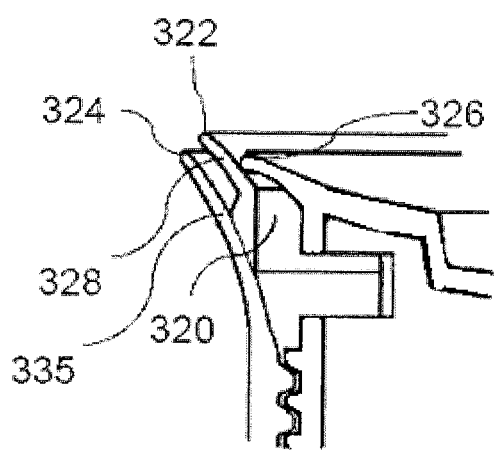
Figure 4B:
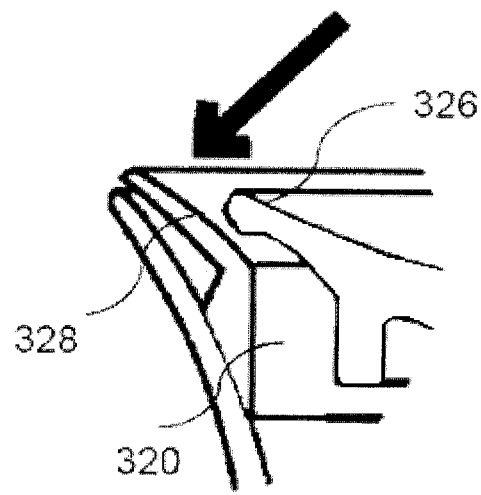
Figure 4C:
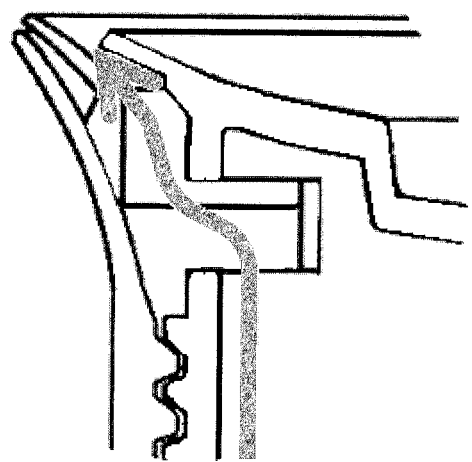

When no force acts on the valve assembly 300, for example no force acts on the sealing cap 350 from a user's lips, then the valve is closed and the valve assembly 300 is in a rest position. The rest position is shown in FIG. 4a. When a user presses his or her lips to the outer rim 322 of the sealing member 320 as shown in FIG. 4b, the sealing member 320 is actuated and the valve opens, forming a fluid flow path from inside the vessel 360 to the user's mouth. The valve assembly 300 is shown in an open position in FIG. 4c, along with a possible fluid flow path which may be formed. In more detail, when a user presses his or her lips to the outer rim 322 of the valve face surface 328/sealing member 320 and hence imparts a downward pressure or force to the outer rim 322, the annular valve face surface 328 flexes away from the annular valve seat 326. In other words, the downward force applied to the outer rim 322 of the sealing member 320 causes the outer rim 322 of the sealing member 320 to move toward the inside wall of the vessel 360 in the vicinity of the user's lip pressure. Thus, the annular valve face surface 328 moves away from the valve seat 326, and thus a possible fluid flow path is formed.

In a manner similar to embodiment 1, lip pressure on a particular point on the sealing member 320 outer rim 322 opens the valve in the vicinity of that particular point. In other words, the lip pressure causes movement of the annular valve face in a region local to the lip pressure. In some embodiments, lip pressure causes movement of the annular valve face surface 328 only in a region local to the lip pressure, while the seal is maintained around the remainder of the circumference of the annular valve face.

In a similar manner to that described above in relation to the first embodiment, when the user wishes to drink from the vessel 360, the valve assembly 300 comprising the vessel 360 and sealing cap 350 is tilted or upended. Liquid in the vessel 360 acts under gravity to pass through the cylindrical hollow region 136 of the cylindrical portion 130 and through the apertures or gaps in the connecting means. When the user applies pressure to the outer rim 322 of the sealing cap 350, as described above the annular valve face surface 328 is moved away from the annular valve seat 326 in the vicinity of the user's lip pressure, thus opening the valve. A fluid flow path is thus formed from inside the vessel 360 to the user's mouth via the hollow cylindrical region 136, through the one or more apertures or gaps in the connecting means, and between the valve face surface 328 and valve seat 326 in the vicinity of the user's lip pressure. This fluid flow path is shown in part in FIG. 4c.

Due to the resilient nature of the material comprising the sealing member 320, once the user's lip pressure is removed the annular valve face is again moved back toward the annular valve seat 326 surface, and the valve assembly 300 moves back into the rest position in which the fluid flow path is blocked.

As described above, the sealing member 320 is coaxial with and fits inside the vessel 360, and is attached to the vessel 360 in a region near the upper rim 324 of the vessel 360. In the embodiments shown in FIGS. 3 and 4, the sealing member 320 extends, and flares, outward substantially parallel to the upper rim 324 of the vessel 360 in the vicinity of the vessel upper rim 324. Because this extending region of the sealing member 320 comprises the annular valve face surface 328, it can also be said that the annular valve face surface 328 extends substantially parallel to the vessel upper rim 324.

Because the sealing member 320, and hence the annular valve face, fits inside the vessel 360 and extends adjacent to the vessel upper rim 324 in this manner, the region of the vessel 360 near the upper rim 324 protects the valve face surface 328 from forces which impact the side of the vessel 360. For example, if a user drops the valve assembly 300, the soft resilient material of the valve face surface 328/sealing member 320 is protected by the rigid plastic material of the cup. Because of the protection afforded by the vessel 360, the valve can be made to be sensitive to a user's lip pressure without being subject to leaks caused by dropping the valve assembly 300.

Having the annular valve face surface 328 extend inside and adjacent to the vessel upper rim 324 is also advantageous for other reasons. It is easier for a user to operate a valve using lip pressure by placing their lower lip on the rigid surface of the outside of the vessel upper rim 324, and their upper lip on the annular valve face surface 328. The valve face surface 328 can then be easily pressed against the inside of the vessel upper rim 324 to open the valve.

It will be understood that the above description of a specific second embodiment is by way of example only and is not intended to limit the scope of the present disclosure. Many modifications of the second embodiment, some of which are now described, are envisaged and intended to be within the scope of the present disclosure.

It will be appreciated that the vessel 360 and valve assembly 300 could be structured so as to remove the need for a sealing member 320. Instead, a region of the vessel 360 in the vicinity of the vessel 360 upper rim 324 could be formed of a resiliently flexible material in order to form a valve face. When the valve element 310 is screwed down onto the vessel 360 in such an embodiment, the part of the outer rim 322 of the sealing cap 350 which forms the valve seat 326 is pressed against the resilient material of the vessel 360 rim in order to form a seal. The user can use pressure from his/her lips to open the valve in a similar manner to that described above.

Figure 5:
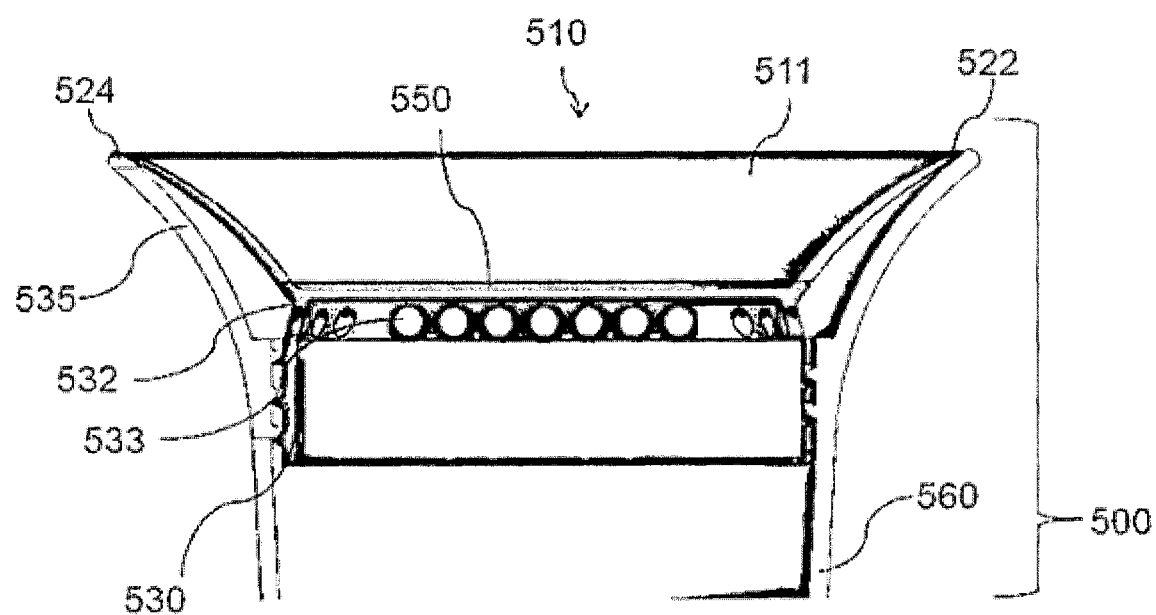
FIG. 5 depicts a cross section of a valve assembly in accordance with a third embodiment.

FIG. 5 shows a cross section of a valve assembly 500 according to a third embodiment. As with the previously described embodiments, the valve assembly 500 comprises a valve element 510 and a vessel 560. The valve element has a cylindrical portion 530 and a sealing cap 550. The sealing cap 550 comprises a cap upper face connected to a flared portion 511. The sealing cap 550 and cylindrical portion 530 are connected via connecting means. Preferably, the valve element is integral such that the sealing cap 550, connecting means, and cylindrical portion form one integral valve component.

The vessel 560 is a relatively standard vessel or cup, but has an outwardly flared region terminating at an upper rim 524. In other words, the vessel outwardly flared region extends both upwardly and radially outwardly toward the vessel upper rim 524. In still other words, the diameter of the vessel 160 generally increases from an upper region of the vessel 560 toward the vessel upper rim 524. The vessel outwardly flared region comprises a flared surface 535. The flared surface 535 is a generally annular surface, and is formed on the vessel inner wall in the vicinity of the vessel upper rim 524. In the embodiment shown in FIG. 5, the flared region of the vessel wall extends substantially from the attachment means, in this case the screw thread of the vessel, toward the vessel upper rim 524. The outwardly flared region may also be described as an outwardly flared portion or an outwardly flared rim.

The cylindrical portion 530 of the valve element 510 comprises an externally threaded portion which co-operates with a corresponding internally threaded portion of the vessel 560 in order to from a screw fit. As with the previously described embodiments, the screw fit may be replaced with any appropriate attachment means, such as a bayonet fitting, a rib and mating groove or a push-fit mechanism. The cylindrical portion is hollow, such that liquid can flow and be stored inside the cylindrical portion.

The sealing cap 550 has an upper face. The upper face is preferably circular. The flared portion 511 of the sealing cap 550 extends upwards and radially outwards from the upper face, and is roughly frustoconically shaped. The flared portion 511 of the sealing cap 550 is more outwardly flared than the flared surface 535. In other words, the gradient of the sealing cap flare is greater than the gradient of the flared surface.

The sealing cap 550 is sized and configured to at least partially fit inside the vessel 560, as shown in FIG. 5. When the sealing cap 550 is attached to the vessel 560 via the screw fit as shown in FIG. 5, the cap upper face fits inside the vessel 560 such that the outer perimeter or circumference of the upper face is located at a position radially inwards from the flared surface 535 of the vessel 560. The difference in flare gradient between the flared portion 511 of the sealing cap 550 and the flared surface 535 of the vessel 560 means that, while the flared portion of the sealing cap 550 begins to flare outward at a position radially inwards from the flared surface 535/flared portion of the vessel 560, the flared portion 511 flares upwards and outwards to meet the flared surface 535. In other words, the flared portion 511 of the sealing cap 550 flares outwards more than the vessel upper rim 524 flares outwards, such that the flared portion 511 contacts an inner surface of the vessel around the circumference of the vessel.

In still other words, the cup or vessel 560 flares outward toward its upper rim 524, forming a flared surface on an inner surface of the vessel. The valve element 510 has a flared portion 511 which also flares outward. The flared portion 511 flares outward to a greater degree than the vessel 560. In more detail, the outer rim 522 of the flared portion 511 meets an inner surface of the vessel 560, where the inner surface is at, or adjacent to, the upper rim 524.

In some embodiments, the flared portion 511 meets the flared surface of the vessel along, at, or adjacent to the upper rim 524 of the vessel. In some embodiments, such as the one shown in FIG. 5, the sealing cap flared portion 511, flares outwards to meet the upper rim 524 of the vessel 560. In other words, in such embodiment, when the valve element is attached to, and located at least partially inside, the vessel 560, the flared portion 511 and the vessel 560 meet at their respective rims.

Figure 6A:
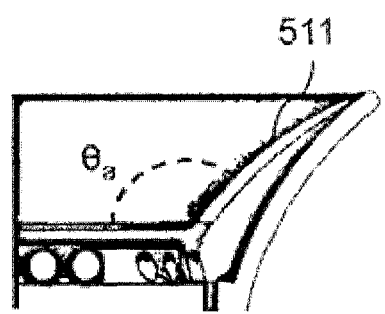
FIG. 6a depicts an angle of flare between a horizontal surface and the flared portion of the valve element.
Figure 6B:
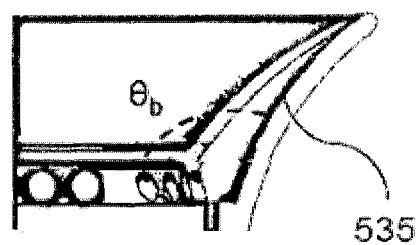
FIG. 6b depicts an angle of flare between a horizontal surface and a flared surface of the vessel.

Both the flared surface 535 of the vessel 560 and the flared portion 511 of the valve element 510 flare upwards, in relation to the vessel in an upright orientation, and radially outwards. As such, the flared portion 511 and flared surface 535 extend in a direction away from a central axis of the vessel. FIG. 6a defines an angle $\theta_a$, and FIG. 6b defines an angle $\theta_b$. $\theta_a$ defines an angles of flare between a horizontal surface, e.g. the upper face of the sealing cap, and the flared portion 511. $\theta_b$ defines an angles of flare between a horizontal surface, e.g. the upper face of the sealing cap, and the flared surface 535. As the flared portion extends toward its outer rim 522, angle $\theta_a$ increases at a first rate of change. As the flared surface extends toward its upper rim 524, angle $\theta_b$ increases at a second rate of change. In other words, and with reference to FIGS. 6a and 6b, it will be appreciated that as the vessel and flared portion extend upwards, the first rate of change, i.e. the rate of change of angle $\theta_a$ is greater than the second rate of change, i.e. the change of angle $\theta_b$.

In the embodiment of FIG. 5, a hollow chamber is formed between a radially outer surface of the sealing cap flared portion 511 and the flared surface 535 of the vessel. The radially outer surface of the flared portion 511 can be described as a lower surface of the flared portion 511, and is the surface which faces the flared surface 535 when the valve assembly is in an assembled configuration. The chamber is roughly annular. The chamber allows fluid to flow therethrough. The size of the chamber and/or gap between the flared surface 535 and the flared portion 511 can be varied. In some embodiments, the flared portion 511 may extend along some or a majority of the flared surface 535. In such embodiments, the flared surface 535 and/or an outer surface of the flared portion 511 are provided with ribs and/or extensions and/or grooves. These features act to ensure that a fluid flow path can be formed between the flared surface 535 and the flared portion 511.

The connecting means of the third embodiment is similar to, and may be identical to, the connecting means described above. As with the connecting means described above, the connecting means 532 comprises a cylindrical connecting portion 532 which comprises at least one aperture 533, and preferably a plurality of apertures 533 positioned around its circumference. Additionally or alternatively, the connecting means may comprise mesh regions as described below. The apertures 533 of the connecting region are configured to provide a fluid flow path between the inside of the vessel 560 to the annular hollow chamber.

The valve assembly 500 components can be manufactured and assembled according to the methods described above. The flared portion 511 of the sealing cap 550/valve element comprises resilient flexible material. The resilient, flexible material may form the outer rim 522 of the flared portion 511, or the flared portion 511 may be entirely comprised of the resilient, flexible material. In a preferred embodiment, the cylindrical portion and cap upper face are formed of rigid plastic material, as is the vessel 560. In other embodiments, the valve element as a whole is completely formed of resilient, flexible material. In such embodiments, the attachment means between the valve element 510 and vessel 560 may be a push-fit or bayonet fitting arrangement.

FIG. 5 shows the valve element attached to the vessel 560 and shows the valve assembly 500 in a rest position, i.e. a user is not trying to drink from the cup and the valve is closed. The flared portion 511 of the sealing cap 550/valve element 510 is configured such that, when the valve element is attached to the vessel 560, the outer rim 522 of the flared portion 511 of the sealing cap 550/valve element presses against an inner surface of the vessel 560 in the vicinity of the upper rim 524 of the vessel 560. The flared portion 511 of the valve element/sealing cap 550 flares outwards to meet, and press against, an inner surface of the upper rim 524 of the vessel 560 to form a seal therewith.

In other words, the outer rim 522 of the flared portion 511 comprises an annular valve face. In particular, a lower surface of the outer rim 522 of the flared portion 511 forms an annular valve face. The annular valve face presses against an inner surface of the vessel 560. In this manner, the inner surface of the vessel 560 comprises a valve seat surface. The flared portion 511 of the sealing cap 550 is formed of resilient, flexible material at least around its outer periphery or circumference, and the resilient nature of the material biases the annular valve face against the annular valve seat surface.

When a user wishes to drink from the valve assembly 500, he or she at least partially inverts the valve assembly 500 so that liquid flows from the vessel 560, through the apertures 532 of the connecting means and into the chamber. The user then applies suction to the outer rim 522 of the flared portion 511, causing the annular valve face to lift upwards and away from the annular valve seat surface, allowing liquid to flow from the chamber, through the gap formed between the annular valve face and the annular valve seat surface in the vicinity of the user's mouth, and into the user's mouth.

In more detail, when a user applies suction to the outer rim 522 of the flared portion 511 of the sealing cap 550, this causes the resilient flexible material of the flared portion 511 to flex and/or invert in the vicinity of the user's lips, thus lifting the annular valve face away from the annular valve seat. As with the embodiments described above, the valve face is configured to lift or move away from the valve seat surface only in the vicinity of the user's lips, with the valve face remaining pressed against the valve seat around the remainder of the periphery of the annular valve face.

When the user stops sucking on the outer rim 522 of the flared portion 511, and thereby stops applying negative pressure to the outer rim 522, the valve assembly 500 reverts to a rest position in which the annular valve face is pressed, i.e. biased, against the annular valve seat surface.

Alternatively, the valve assembly of the third embodiment can be configured to open in response to a user's lip pressure. In such an embodiment, the user would use their lips to push the outer rim 522 of the flared region 511 away from the vessel upper rim 524, thus opening the seal in the vicinity of the user's lip pressure. In such an embodiment, the outer rim 522 of the flared portion 511 is configured to deform from its rest shape upon the application of pressure from a user's lips, such that the outer rim 522 lifts from the flared surface 535, i.e. such that the valve face is lifted from the valve seat, thus opening the valve. The flared portion 511 can be configured to deform in different ways upon the application of pressure from a user's lips. For example, the outer rim 522 can be configured to roll backwards and/or partially invert upon the application of pressure. The flared portion 511 can be configured to roll, fold, and/or crease in response to pressure on the outer rim 522, and/or in response to the user pressing the outer rim 522 down and along the flared surface 535.

Alternatively or additionally, a lower surface of the flared portion 511 may comprise pivotal protrusions in the manner described above in relation to the first embodiment. In such an embodiment, a lower surface of the flared portion 511 comprises a projecting annular valve face and at least one pivotal protrusion. The pivotal protrusion is arranged between the outer rim 511 and valve face. This arrangement allows a user to apply pressure to the outer rim 522 to open the valve. To open the valve, a user presses down on the outer rim 522, causing it to move toward the flared surface 535. As the movement continues, the at least one pivotal protrusion contacts the flared surface 535, and the valve face moves away from the valve seat via a pivoting movement around the at least one pivotal protrusion, thus opening the valve.

It will be understood that the above description of a specific valve assemblies, vessels and valve elements is by way of example only and is not intended to limit the scope of the present disclosure. Many modifications of the second embodiment, some of which are now described, are envisaged and intended to be within the scope of the present disclosure.

Although a particular connecting means structure has been described above, it will be appreciated that the connecting means may take a variety of forms while allowing the operation of the valve assembly as described above. For example, the connecting means may comprise a plurality of ribs which connect the sealing cap and cylindrical portion, the ribs having gaps therebetween to allow the passage of fluid therethrough. The connecting means may instead, or additionally, comprise a connecting region which has a plurality of apertures therein to allow the passage of fluid. The connecting means may additionally, or alternatively, comprise a mesh region or mesh regions. For example, mesh regions could be provided between each of the ribs of a plurality of ribs. In such a connection means, the ribs provide structural integrity, whilst the mesh region regulates the flow rate of fluid flowing through the connecting means. The mesh region may instead comprise the entire connecting means, and in such a connecting means the mesh region is preferably comprised of a rigid plastic mesh or grill. The size of the apertures of the mesh and/or between the ribs can be adjusted by the manufacturer in order to regulate the fluid flow rate through the connecting means. The skilled person will appreciate that the connecting means may take many forms, provided that the connection means allows for the sealing cap and cylindrical portion to be connected, preferably rigidly connected, whilst also allowing a fluid flow path to be formed from the vessel and into a user's mouth as described above.

Figure 7:
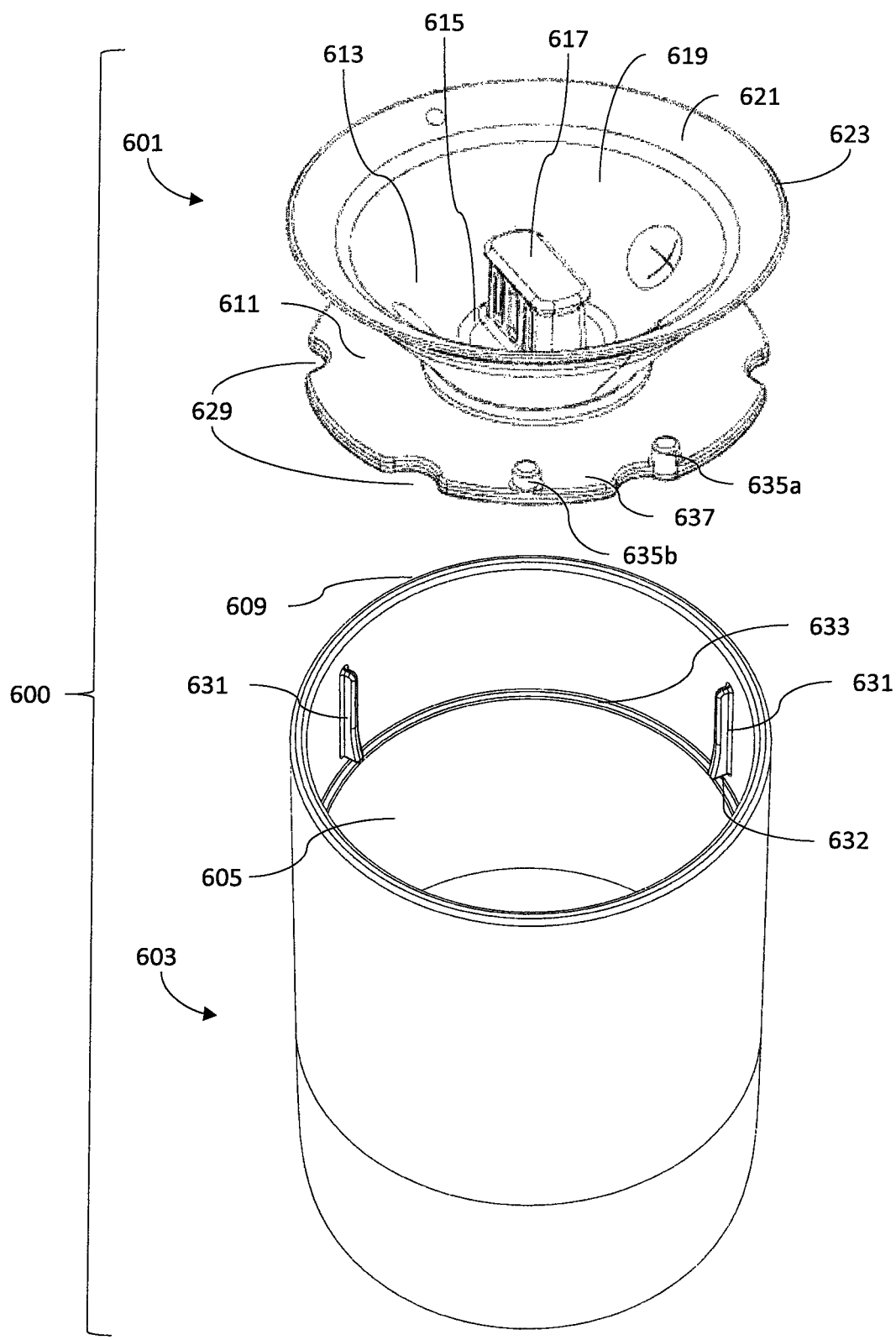
FIG. 7 depicts an exploded view of a valve assembly in accordance with a fourth embodiment.
Figure 8:
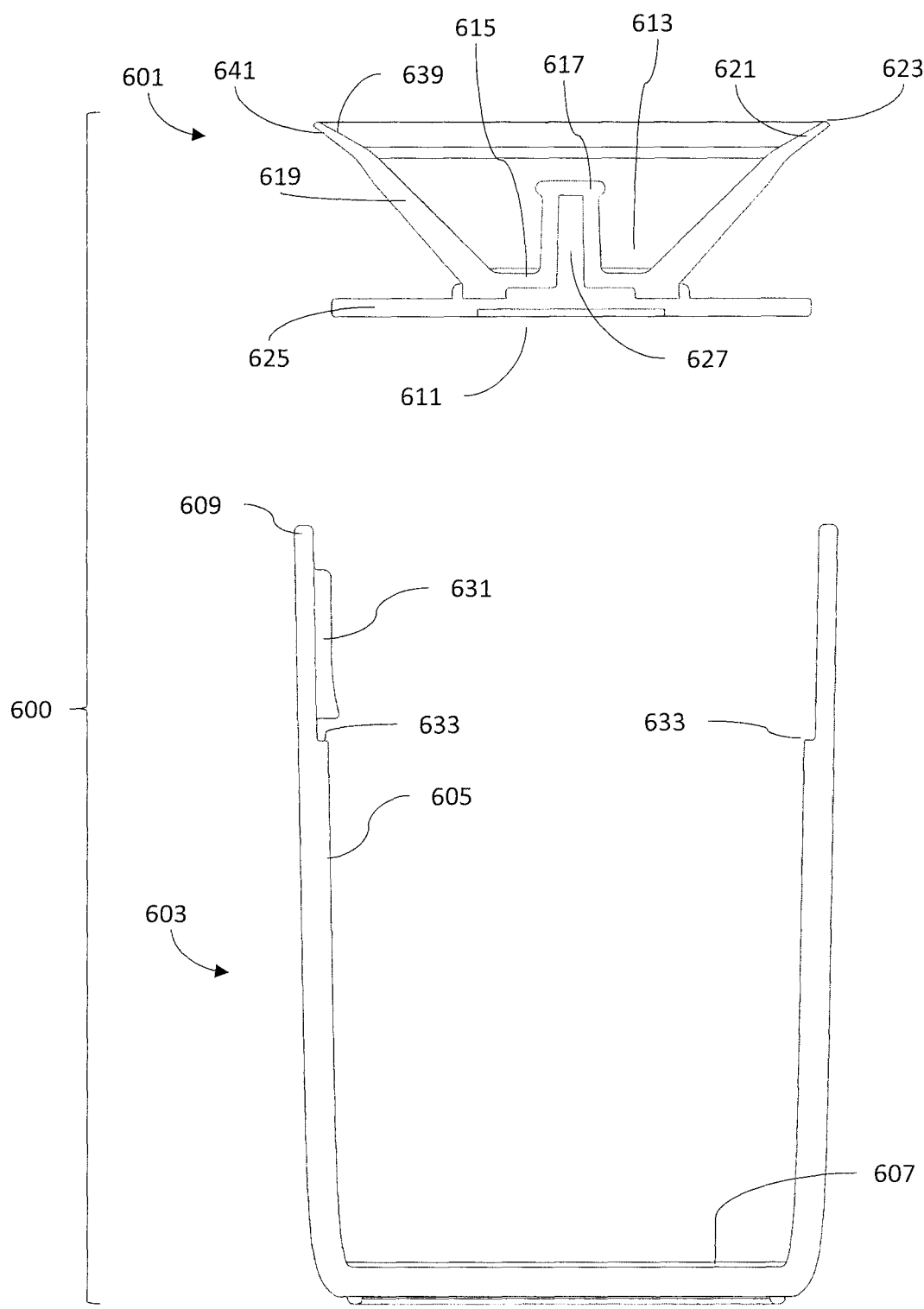
FIG. 8 depicts a cross section view of a valve assembly of the fourth embodiment.

FIGS. 7 and 8 depict an exploded view of a valve assembly 600 in accordance with a fourth embodiment of the present disclosure. The valve assembly comprises a valve element 601 and a vessel 603. The vessel 603 is substantially cylindrical and comprises volume for receiving liquid defined by a base 607 and an inner wall 605 extending upwards from the base 607 terminating at a lip 609.

The inner wall 605 comprises several vertical ribs 631 which extend down the inner wall 605 from a position proximate the lip 609 away from the lip 609 towards the base 607 and terminating at a lower edge 632. Each lower edge 632 is located equidistant above a circumferential shoulder 633 in inner wall 605 which shoulder 633 projects inwardly from the inner wall 605.

The valve element 601 comprises a baffle 611 and a body 613. The body 613 comprises a central portion 615 with a handle 617 projecting upwards therefrom. The handle 617 has a rounded rectangular profile but may be any suitable shape that enables the user to easily grip the valve element 601 and insert it into the vessel 603.

The body 613 further comprises a resiliently deformable portion 619 extending towards a rim 621 and terminating at an outer edge 623. The resiliently deformable portion 619, including the rim 621 and outer edge 623 is arranged in a substantially frustoconical shape or plane, said frustoconical shape extending upwardly and outwardly from the central portion 615.

The baffle 611 comprises an annular disc 625. As shown in more detail in the cross-section view of FIG. 8, the annular disc has an axial pin 627 projecting vertically from its upper surface. In this embodiment the axial pin is moulded to and forms the core of the handle 617 of the body 613.

As shown in FIG. 7, a number of cut-out portions 629 are arranged around the perimeter of the annular disc 625. The cut-out portions 629 correspond to openings extending through the axial thickness of the annular disc 625 and sized to have a radius to the apex of each opening larger than the protrusion distance of the vertical ribs 631 inwardly of the vessel inner wall 605.

Also arranged around the perimeter of the annular disc 625 are pairs of bosses 635a and 635b. The bosses project vertically upwards a few millimetres from the upper surface of the annular disc 625. One of each pair of bosses is located on either side of a cut-portion 629. The first boss 635a of each pair is located directly adjacent a first side of one cut-out portion 629. The second boss 635b is not located directly adjacent the opposing side of the same cut-out portion 629 but is instead located a short distance further around the annular disc 625 perimeter. Located between the second boss 635b and the opposing side of the cut-out portion is a locking area 637.

The resiliently deformable portion 619 comprises a frustoconical shape with a lower region extending upwards and outwards from the central portion 615 substantially at angle of 45° to the horizontal. At its lower circumference the resiliently deformable portion 619 comprises a wall thickness of approximately 4 mm, tapering to a wall thickness of approximately 2 mm at its upper circumference.

The rim 621 comprises an upper surface 639 and a lower surface 641. The rim 621 extends from the upper circumference of the resiliently deformable portion 619, of diameter approximately 60 mm, to an outer edge 623 of diameter approximately 72 mm.

The lower surface 641 of the rim 621 is angled substantially at an angle of 38° to the horizontal while the upper surface 639 is angled at a more acute angle. In other words, the angle of the upper surface 639 is closer to the horizontal than the lower surface 641. Consequently, the rim 621 tapers as it extends outward from the upper circumference of the resiliently deformable portion 619, decreasing in thickness towards the outer edge 623 to a thickness of 0.9 mm at the outer edge 623.

Figure 9:
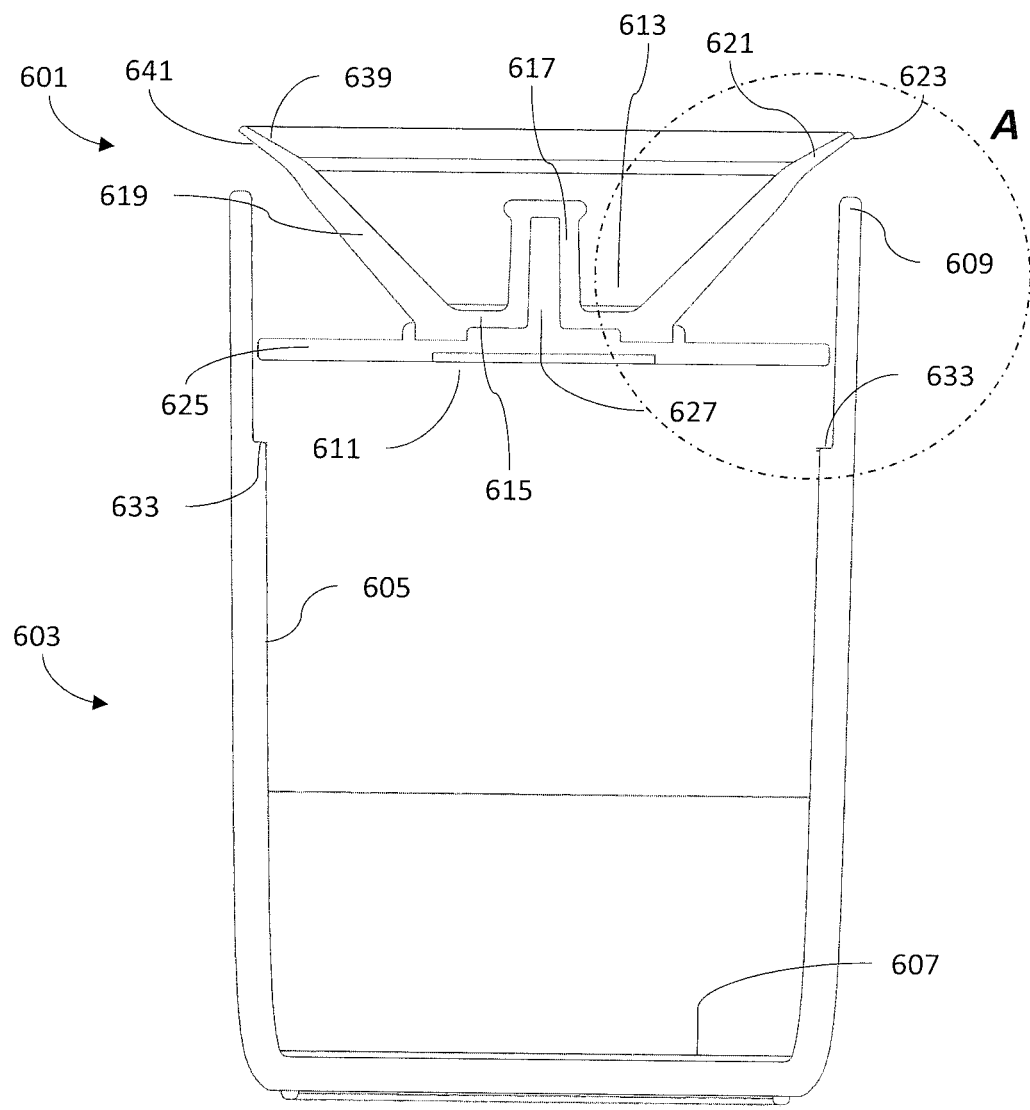
FIG. 9 depicts a cross section view with the valve element of the fourth embodiment partially inserted into the vessel.

Turning to the assembly of the valve assembly, FIG. 9 shows the valve element 601 coaxial with and partially inserted into the vessel 603. The annular disc 625 of the baffle 611 has a diameter less than the inner wall 605 but larger than the diameter of the circumferential shoulder 633 thereby allowing the valve element 601 to be inserted cleanly into the vessel 603 until the lower face of its annular disc 625 engages and rests on the circumferential shoulder 633.

In contrast, the outer edge 623 extends outwardly to a diameter larger than that of the inner wall 605. In the example shown, the rim 621 extends to an outer edge 623 of diameter 72 mm compared to the diameter of 67 mm of the inner wall 605 proximate the lip 609. It will be understood that other suitable diameters of the vessel 603 and valve assembly 600 are envisaged.

Figure 10A:
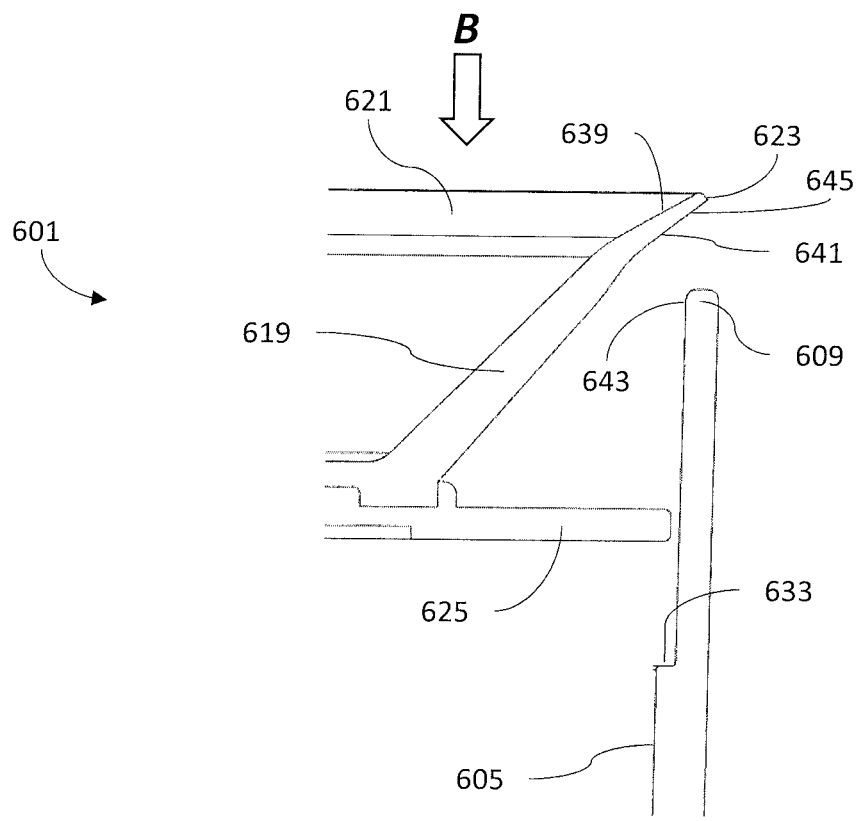
FIG. 10a depicts a close-up cross section of the valve assembly of FIG. 9.

FIG. 10a shows a close-up view of circled region A of FIG. 9 to illustrate the different diameters more clearly. As explained above, the body 613 of the valve element 601 has a rim 621 arranged in a plane. In the partially inserted position of FIG. 10a, the valve element 601 is coaxial within the vessel 603 such that the rim 621 and the plane it is located in extend radially beyond the inner wall 605 and lip 609 of the vessel 603.

Located on the vessel inner wall 605 and arranged in an annular path therearound is an engagement surface 643. The engagement surface 643 is proximate the lip 609, extending several millimetres down the inner wall 605.

Located on the lower surface 641 of the rim 621 and arranged in an annular path therearound is a sealing surface 645. The sealing surface 645 is proximate the outer edge 623, extending inwardly therefrom.

Figure 10B:
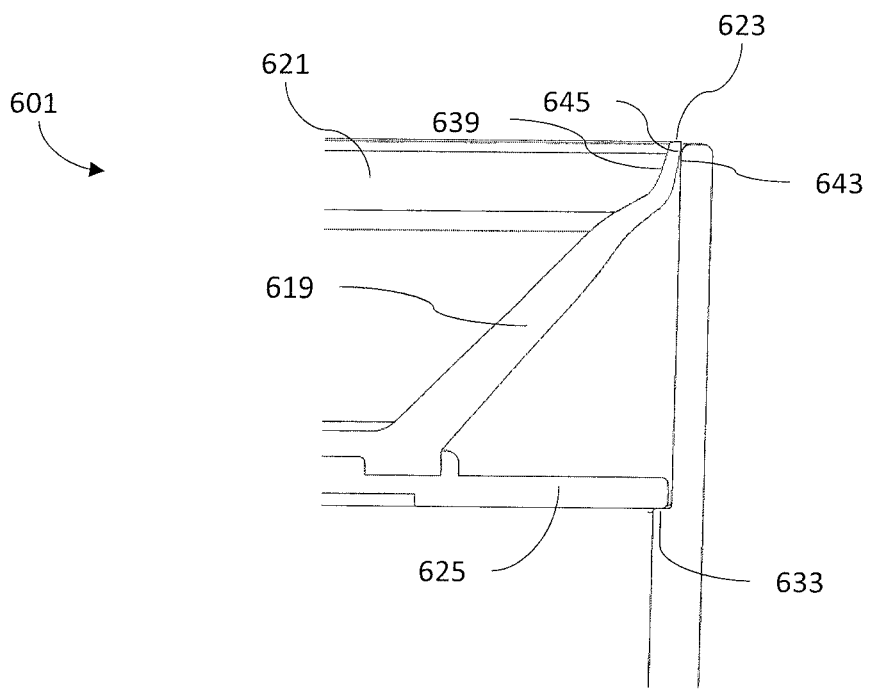
FIG. 10b depicts a close-up cross section of the valve assembly of the fourth embodiment with the valve element arranged within the vessel in a sealing position.

With the valve element 601 only partially inserted, the rim 621 is not deformed. However, as the valve element 603 is inserted into the vessel 603 in the direction of the arrow B, the rim 621 engages with first the lip 609 and then the inner wall 605 deforming the rim 621 inwardly to enable it to locate within the vessel 603 in a sealing position shown in FIG. 10b. Because the wall thickness of the rim 621 is substantially less than lower portion of the resiliently deformable portion 619, the rim 621 deforms preferentially as the valve element 601 is inserted into the vessel 603.

Once in the sealing position, the sealing surface 645 forms a sealing abutment with the engagement surface 643. The diameter of the outer edge 623 and the thickness of the rim 621 ensures that the rim 621 is able to deform inwardly to an angle to closely conform to the angle of the inner wall 605. As the angle of the engagement surface 643 is substantially vertical then the angle of the sealing surface 645 is also substantially vertical. In this way, the sealing abutment comprises more than just a "point seal" of two annular edges engaging or resting against one another and instead comprises two annular faces engaging one another. Consequently, the sealing abutment comprises an annular seal extending with a significant height down the inner wall 605. Such a seal offers considerably more reliability in preventing leaks and is more resilient to ingress of contaminating particles that would otherwise prevent the sealing surface 645 engaging and sealing with the engagement surface 643.

In the sealing position, the rim 621 is located in a second plane so that the outer edge 623 sits above the sealing surface 641. In this second plane the rim is now deformed out of the first plane and also out of the plane of the inner surface of the remaining portion of the resiliently deformable portion 619 which remains substantially in its original plane. In other words, in going from the arrangement in FIG. 10a to the arrangement in FIG. 10b, the outer surface 641 of rim 621 is deformed from being substantially co-planar with the inner surface of the remaining portion of the frustoconical resiliently deformable portion 619 to being in a second plane and the sealing surface 645 being substantially cylindrical.

Figure 10C:
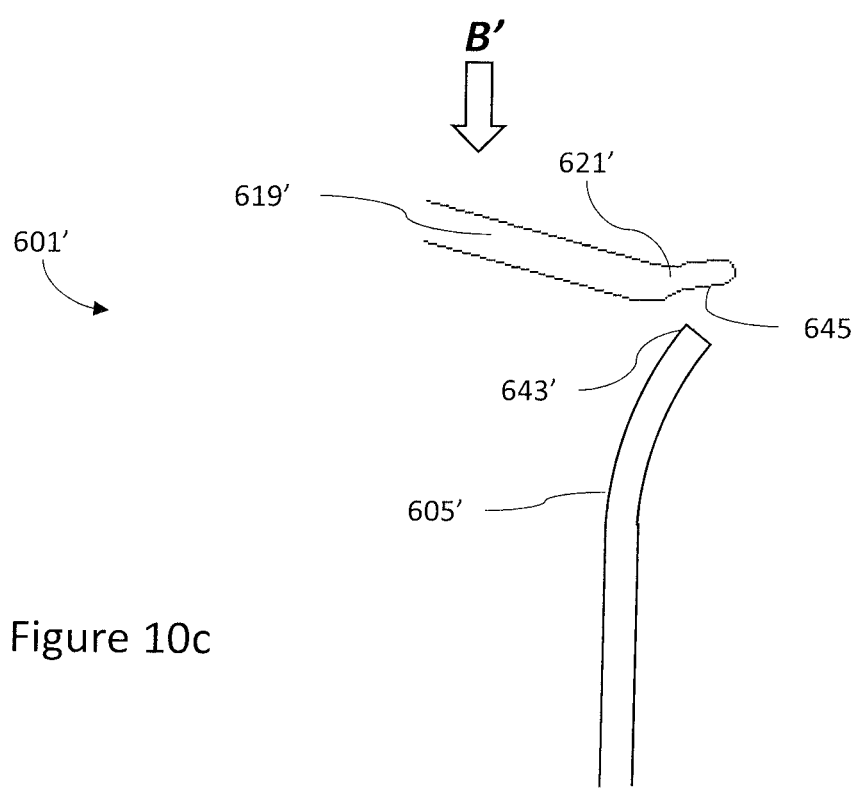
FIG. 10c depicts a close-up cross section view of an alternative arrangement in accordance with the fourth embodiment.

The arrangement in FIG. 10a shows that the rim 621 is moulded substantially co-planar with the remaining portion of resiliently deformable portion 619 so that together both form a frustoconical shape. However, other arrangements are possible wherein the rim 621 and the remaining portion of resiliently deformable portion 619 are not moulded to be co-planar, for example the remaining portion of the resiliently deformable portion 619 is horizontal and the rim 621 is arranged at an angle to it. Or, the rim 621 is moulded horizontal and the remaining portion of the resiliently deformable portion 619 is not horizontal. An arrangement such as the latter is shown in FIG. 10c and may be suitable where the engagement surface 643' of the inner wall 605' is substantially flared and the moulded angles of the resiliently deformable portion 619' and its rim 621' are chosen to ensure the rim 621' is deformed sufficiently to create a sealing abutment as the valve element 601' is inserted into the vessel 603' in direction of the arrow B'.

Figure 11:
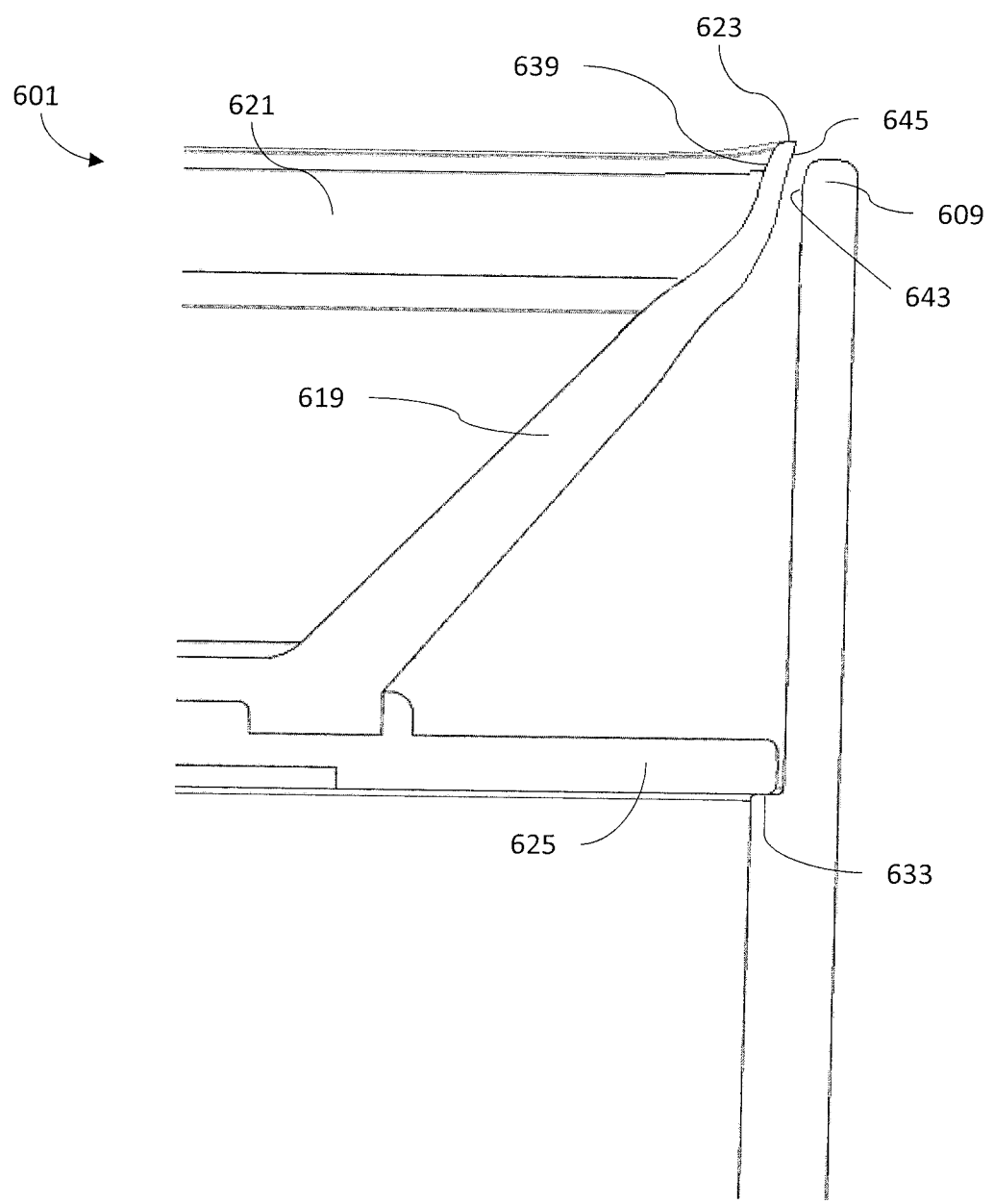
FIG. 11 depicts a close-up cross section view of the valve assembly of the fourth embodiment in a drinking position.

FIG. 11 shows a close-up of the valve element 601 in a further, drinking position. In this position, a portion of the rim 621 is lifted by the action of a suction force applied to the upper surface 639 of the same portion of the resiliently deformable portion 619. With the portion of the rim 621 being so lifted, a portion of the outer edge 623 is separated from the lip 609 causing a portion of the sealing abutment to unseal. In other words, suction applied to a portion of the upper surface 639 causes a corresponding portion of the sealing surface 645 to separate and unseal from a portion of the engagement surface 643. The lifting action created by the suction force on a portion of the resiliently deformable portion 619 lifts at least a corresponding portion of the rim 621 out of its second plane.

When the user wishes to use the valve assembly 600, the valve element 601 is detached from the vessel 603 so that liquid can be poured inside. The valve element 601 is then inserted into the vessel 603 until the annular disc 625 engages the circumferential shoulder 633 and can be locked to the vessel 603 by a relative rotation. With the valve element 601 thus inserted, the rim 621 is deformed substantially inwardly such that the sealing surface 645 forms a sealing abutment with the engagement surface 643 on the inner wall 605 of the vessel 603. Thus formed, the sealing abutment is able to prevent liquid from spilling from the valve assembly 600 until the user wants to take a drink.

When the user wants to take a drink from the vessel 603, the valve assembly 600 comprising the vessel 603 and the valve element 601 is deliberately tilted or upended. Liquid in the vessel 603 acts under gravity to flow through one or more of the cut-out portions 629 of the annular disc 625 until it reaches the lower surface 641 of the resiliently deformable portion 619. At this point, in the absence of other actions, the liquid is retained within the vessel 603 by the sealing abutment.

When the user places their mouth around a portion of the lip 609 of the vessel 603 they are able to form an airtight seal between their upper lip and the upper surface 639 of a portion of rim 621. The user then gently sucks, in a manner akin to drinking from an open cup, causing at least the portion of the rim sealed by the upper lip to lift and unseal a corresponding portion of the sealing abutment. With this portion of the sealing abutment unsealed, the liquid can flow out of the vessel 603 into the user's mouth.

When the user wants to stop drinking, they simply stop sucking or begin to take their mouth away from the valve assembly 600, breaking the seal of their upper lip and the upper surface 639. Either action removes the suction force from the portion of the resiliently deformable portion 619 thereby allowing it to revert back to the sealing position. In other words, the resilient nature of resiliently deformable portion ensures that a complete sealing abutment is re-engaged around the inner wall 605.

The components of the valve assembly 600 can be formed in any appropriate manner, for example compression or injection moulding. Suitable manufacturing techniques include forming the components in two-step processes such as co-moulding or over-moulding. The constituent pieces of the valve assembly 600 can be formed of any appropriate polymeric material. The vessel 603 and baffle 611 can be formed of any appropriate rigid plastics material, such as thermoplastic materials such as polypropylene PP, polycarbonate PC, polyphenylsulfone PPSU, glass-filled nylon, or similar material blends as appropriate. The vessel 603 and the baffle 611 are not necessarily formed from the same material. The body 613 can be formed, at least in part, from any appropriate resilient, flexible material such as silicone rubber, thermoplastic elastomer (TPE), ethylene propylene diene, styrene butadiene or polyurethane. In the embodiment shown in FIG. 7, the vessel is formed of polypropylene, the baffle 611 is formed of a glass-filled nylon, while the remaining components of the body 613, including the resiliently deformable portion 619 and the rim 621 are formed of a flexible silicone rubber of hardness Shore A 50-55. Such a silicone rubber provides a deformable rim while allowing for a soft surface which contacts the user's lips. The resilient nature of the material also provides a biasing effect and ensures that the sealing abutment remains in a sealing position, as discussed above.

It will be understood that the above description of a specific embodiment is by way of example only and is not intended to limit the scope of the present disclosure. Many modifications of the fourth embodiment are envisaged and intended to be within the scope of the present disclosure.

As the present embodiment comprises a cylindrical vessel 603 and an annular rim 621 then the user may place their mouth at any point around the lip 609 of the vessel to try to drink. The suction force may thus be applied to any portion of the upper surface 639 of the resiliently deformable portion 619 in order to achieve the lifting or unsealing action described above. Thus, the user is able to drink from any point around the valve assembly 600.

The engagement surface 643 and sealing surface 645, and hence the sealing abutment, may be located proximate lip 609 but could also be located lower down the inner wall 605 without affecting the sealing effectiveness so long as the rim 621 is deformed within the inner wall 605 when the valve element 601 is inserted into a suitable sealing position. Consequently, the vertical position of the sealing abutment in relation to the inner wall 605 can vary without affecting its sealing ability, so long as the difference between the diameter of the outer edge 623 and the diameter of the inner wall 605 at the engagement surface 643 remains the same. In other words, so long as the engagement surface 643 provides the same deformation of the rim 621 into the sealing position, or the second plane, so that the contact between the sealing engagement surfaces is of comparative vertical height then the sealing abutment will be equally reliable regardless of the vertical position on the inner wall 605 of the vessel 603.

While the effectiveness of the sealing abutment of the valve assembly is not affected by the vertical height within the vessel 603, in the present embodiment it has been found to be advantageous for the user's drinking action to locate the sealing abutment proximate the lip 609. In this way, in the sealing position, the outer edge 623 of the resiliently deformable portion 619 rests slightly vertically above the lip 609 thereby allowing the user to easily make an air-tight seal between their upper lip and the upper surface 639. In this way, the user finds it easy to drink from the valve assembly 600 with a natural drinking action and does not have to alter the angle of the valve assembly 600 in their mouth or how far into their mouth they place the lip 609 in order to unseal a portion of the rim and drink easily. In particular, for infants and young children who are learning to drink from an open cup, the arrangement allows them to learn a "grown-up" drinking style without accidental spills.

The sealing and engagement surfaces 643 and 645 are moulded as smooth in the present embodiment. However, they may be modified in any known way such as by adding texturing or patterns to modify or control the friction between the two surfaces in order to moderate both the resistance to inserting the valve assembly 601 into the vessel 603 and the ease with which portions of the abutment unseal when the user drinks from the valve assembly 600.

The material chosen for one or more of the surfaces 643 and 645 may differ to its respective supporting feature, for example, by co-moulding or attaching by other means a second layer to the rim 621 or the inner wall 605, in order to further adjust the effectiveness of the sealing abutment.

The body 613 may further comprise an air vent as known in the art, in order to allow air into the vessel as the user drinks liquid from the vessel. Such air vents, for example a slit valve or a cross-cut dome valve cut located through any suitable portion of resilient elastomer, ensure that the pressure within the vessel remains equalised with the ambient pressure outside the vessel as the user drinks.

In the specific embodiment of FIGS. 7 to 11, the circumferential shoulder 633 is located 29 mm vertically down from the lip 609. However, this location may be altered so that the circumferential shoulder 633 is higher or lower on the inner wall 605. The shoulder may also be replaced by other suitable physical stops or means of engagement.

Furthermore, the vertical height of the body 613 can be altered by changing the angle to the horizontal of the resiliently deformable portion 619 and/or by changing the thickness dimension of the annular disc 625. The annular disc 625 may also be replaced by suitable supporting arrangements, such as a number of supporting arms with gaps in between. Or, again, the cut-out portions 629 may be a different shape or configuration, as known in the art, as necessary to control the flow of liquid from the vessel to the sealing abutment. All such variations are feasible within the scope of the embodiment so long as the valve element 601 and the vessel 603 are arranged so that in a sealing position the rim 621 of the resiliently deformable portion 619 is deformed substantially inwardly to be located within the valve assembly.

The size and arrangement of at least some of the cut-out portions 629 correspond with the size and arrangement of the vertical ribs thereby ensuring the valve element 601 must be arranged in a specific rotational orientation as it is inserted into the vessel 603. Once in the correct orientation, the valve element 601 is inserted into the vessel 603 until the lower surface of the annular disc 625 rests on the circumferential shoulder 633. With the valve element 601 resting on the circumferential shoulder 633, it can be locked to the vessel 603 by rotation relative to the vessel 603 as described below.

In the specific embodiment, the location of the pairs of bosses 635*a* and 635*b* are such that locking rotation is unidirectional. In other words, with the valve element 601 resting on the circumferential shoulder 633, at least one first boss 635*a* engages with a rib 631 preventing rotation in one direction.

The lower edges 632 of each rib 631 are located 3 mm above the circumferential shoulder 633 to provide a vertical space which corresponds closely to the thickness of the annular disc 625. In this way, when resting on the circumferential shoulder 633 the valve element 601 can be rotated to move a second boss 635*b* towards a rib 631 such that at least one locking area 637 engages a lower edge 632 thereby attaching the valve element 601 to the vessel 603.

In order to remove the valve element 601 from the vessel 603 the rotation and insertion steps described above are reversed.

In the present embodiment, the inner wall 605 is provided with three vertical ribs 631 spaced at 120° intervals around the inner circumference of the vessel 603. The annular disc 625 comprises six cut-out portions 629, spaced at 60° intervals around its circumference, and two pairs of bosses 635*a*, 635*b* arranged diametrically opposite each other. With the ribs 631, cut-out portions 629 and bosses 635*a*, 635*b* so arranged the valve element 601 can be oriented in any one of six rotational orientations and always locate, insert and lock to the vessel 603.

The number and orientation of the locking features can be amended or modified as appropriate to provide an effective locking mechanism. For example, more or fewer ribs, cut-out portions and/or bosses may be provided as suitable. In addition, or instead, the ribs may be provided in an angled or helical arrangement. Further, the bosses and lower edges of the ribs may be modified to provide other means of engagement.

Yet further, the ribs, cut-out portions and/or bosses may be replaced entirely with other means of engagement as known in the art, for example clip fit or interference fit features, or screw threads, or the like.

In the present embodiment, the valve element 601 is moulded as a unitary part by over-moulding or co-moulding the handle 617 onto the axial pin 627. However, the valve element 601 may comprise two or more parts, for example the body may be moulded separately from the baffle and attached together by known means, such as push fit. Alternatively, an additional fastener part may be used to secure a body part to a baffle part. In a yet further alternative, a baffle may be omitted, and the body may be attached directly to the inner wall, outer wall or base of the vessel by known attachment means. Such attachment means may be either similar or different to the baffle attachment means described above.

Some valve elements of the present disclosure may comprise a water filter unit. The water filter unit may be fitted inside the hollow region of the cylindrical portion. Such a water filter unit would act to filter liquid as it passes from the vessel and through the connecting means.

The valve assemblies disclosed herein have annular parts, high degrees of circular symmetry and may comprise valve faces which press against valve seats around an entire perimeter or periphery of the annular valve face. It will be appreciated that the valve assemblies disclosed herein can be described as 360° valves, because a seal is formed around 360° of the vessel and the valve assemblies allow a user to drink from any point on a perimeter of the upper rim of a drinking vessel.

A particular advantage of the valve assemblies disclosed herein is that a user applies direct contact pressure with their lips in the vicinity of the valve face. In the first embodiment, the annular valve face is located on a lower surface of the valve element, and it is the rim of this lower surface, in other words the outer rim of the valve element, and in particular the outer rim of the sealing cap, which the user applies direct pressure to. In the second embodiment, the user applies direct contact pressure to the outer rim of the annular valve face. In other words, in embodiments disclosed herein, pressure is applied to a certain point on the rim, and the movement of the valve is localised to this certain point. In broader terms, the part of the valve which the user contacts is the part of the valve which moves in order to allow fluid to flow from the vessel. This arrangement allows a user to exercise a much greater control over the valve face surface, and this in turn allows greater control of a fluid flow rate from the vessel. This is in contrast to known assemblies, some of which have multiple component parts which separate the point of lip contact and the part of the valve which moves to allow fluid to flow in response to the fluid contact. In known assemblies, rather than the small localised movements allowed by the present valve assemblies, large parts of the valve must move in response to the user's lip pressure. These assemblies by necessity cannot be as sensitive, or give a user such fine control over fluid flow, as the present valve assemblies.

In some embodiments disclosed herein, the valve element and vessel are arranged coaxially with respect to one another. In other words, the valve element and vessel share a common axis and display a great deal of rotational symmetry about this axis. In part, it is this coaxial arrangement which allows for an infant or other user of the valve assembly to apply pressure to any point on the perimeter/circumference of the outer rim and thus drink from the valve assembly/vessel in any orientation. Thus, a so-called 360° valve is provided. This type of valve assembly allows an infant to progress from more traditional infant cups, which have spouts or teats, to a cup which more resembles the 'open ended' cups from which the infant will be expected to drink as an adult.

The disclosed valve assemblies comprise two main components: the vessel and the valve element. Importantly, a seal is formed between these two components in a simple manner without the need for additional parts, components or valve parts. The infant cup industry is one in which increased simplicity is valued by manufacturers and consumers. It will be appreciated that not only are the valve assemblies of the present disclosure easy for a user to take apart and re-assemble, for example in order to clean the assembly or fill the vessel, but they also bring manufacturing efficiencies and associated cost savings due to the reduced number and complexity of the component parts.

In the embodiment shown in FIG. 1, the sealing cap, annular valve face and cylindrical portion are integral, thus forming a single integral component which is easily removed from the vessel in order to clean the component and vessel, and/or refill the vessel with liquid. The integral valve element component can be easily and simply reconnected to the vessel by the user. In the embodiment shown in FIG. 3, the sealing member is integral with the vessel, which results in an assembly which only requires two main components to operate. In other words, in the FIG. 3 embodiment, a first component comprises the vessel and the sealing member, and a second component comprises the valve element. In the embodiment shown in FIG. 5, the cylindrical portion, connecting means, and sealing cap are integral, and together form the valve element. Thus, as with the other disclosed embodiments, the valve assembly of FIG. 5 only requires two components to operate as a valve: the vessel and the valve assembly. In the embodiment shown in FIG. 7, the body, including the resiliently deformable portion, and the baffle including the annular disc are moulded as a unitary part. Thus, again, the valve assembly of FIG. 7 only requires two components to operate as a valve: the vessel and the valve assembly.

The biasing force between the vessel and valve elements of the present disclosure can be fine-tuned by adjusting the screw fit arrangement or the attachment means. This can be done on the manufacturing side, for example by adjusting the size, number of turns and location of the threading, and it will be appreciated that valve assemblies according to the present disclosure provide valves which have a sealing strength which can be easily adjusted by the manufacturer to ensure a consistent biasing force every time the user screws the valve assembly onto the cup. The amount of biasing force may be determined or controlled by the depth to which the valve element can be screwed down relative to the vessel. The manufacturer may opt to control this depth, and hence the biasing force, by incorporating a click or stop on the screw thread, or by adding a visual marker to the top of the valve element so that the user stops rotating when it lines up with a corresponding marker on the cup rim.

Alternatively, or additionally, the biasing force/strength can be adjusted on the consumer side, as it will be appreciated by the skilled person that tightening the screw fit, and thus increasing the pressure with which the valve element presses down onto the vessel, will in turn cause an associated increase of the biasing force between the valve face and seat.

Valve assemblies of the present disclosure may comprise air vents and/or air valves. Such air valves may be formed in the valve element, and may take the form of a one-way air-inlet valve of any appropriate type, for example an integrally moulded duck-bill valve or dome valve. Such air valves allow the passage of air therethrough such that pressure can be equalised between the atmosphere and the interior of the cup.

The valve elements depicted in the FIGS. 1 to 6 generally comprise a sealing cap connected by connecting means/connecting structure to a cylindrical portion, and the vessels generally comprise an interior region which is suitable for holding liquid and an upper rim from which the user can drink. The valve element is attached to the vessel via attachment means, e.g. a screw thread on an exterior portion of the valve element and a corresponding screw thread on an interior of the vessel. The respective valve elements can be removed from a vessel in order to refill the vessel and/or clean the respective valve element and vessel. In the valve assemblies depicted in the figures, an attachment means is provided between the valve element and vessel. However, while the valve assemblies depicted in the figures comprise a single component vessel, this need not be the case. Vessels of the present disclosure may comprise a plurality of components. Attachment means between the valve element and vessel may also take a different form than that shown in the figures, or may be omitted from the assembly entirely.

For example, in some embodiments a different valve assembly structure is utilised. The vessel may have multiple components, for example an upper vessel component and a lower vessel component which are removably detachable from one another. The upper component may comprise the vessel upper rim, while the lower component may comprise the interior region which is suitable for holding and/or storing liquid. The upper component may be a collar or upper rim which is removably attachable to the lower vessel component. The collar may be removably attachable to the valve element, or may be integral with the valve element. A vessel component attachment means may be provided between the vessel upper component and the vessel lower component. In such embodiments, the sealing cap and cylindrical portion may be integral with the upper component of the vessel.

The valve assembly may comprise two attachment means, the first between the vessel components and the second between the valve element and one of the vessel components. The first attachment means may be a push fit-arrangement/mechanism, a screw thread, or a bayonet attachment. When the two vessel components are attached to each other, they form a valve assembly similar to that depicted in FIG. 1, 3 or 5.

Whilst valve assemblies have been described which have high degrees of circular symmetry, and which are suitable for allowing a user to drink from any point around an upper rim of the vessel, it will be appreciated that this may not always be the case. For example, breaks and discontinuous portions may be provided in the outer rim of the sealing cap. The valve assemblies shown in the figures can be modified to allow a user to drink from any desired amount of the upper rim. For example, rather than the entire circumference of the upper rim, the valve assemblies of the present disclosure may be suitable for allowing a user to drink from any point on the rim perimeter defined by a sector having an angle from, for example, around 10° right through to the full 360°.

As will be appreciated by those skilled in the art, the components of the valve assembly can also be produced via additive manufacturing, for example via the use of a 3-D printer. First, a computer-readable file containing data representative of a valve component is produced. The data may be representative of the geometry of successive cross-sections of the component. This data is often called 'slice' or 'layer' data. The data can be produced from a CAD-style file, or via the use of a 3-D scanner. A 3-D printer can then successively lay down layers of material in accordance with the cross-section data to produce the valve components.

It will be appreciated that relative language such as upper, inner, outer, etc. is used herein. This language refers to the assembled valve assembly, i.e. when the valve element is attached to the vessel, and/or when the vessel is in an upright orientation as shown, for example, in FIGS. 1 and 3 and 7-11. Vertical and horizontal, as well as angles measured therefrom are to be understood as if the valve assembly and components are resting on flat support surface such as a table. Up and down, upper and lower, and other relative directional terms are to be determined accordingly unless otherwise stated. This language is used to aid understanding of the disclosed valve assemblies and should not be considered to limit the present disclosure.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

Further aspects and embodiments of the present invention are recited in the following numbered clauses:

1. A valve assembly for allowing a user to drink from any point around an upper rim of a drinking vessel, the valve assembly comprising:
   a vessel flared surface, the flared surface flaring upwards and radially outwards toward the vessel upper rim;
   a valve element comprising a sealing cap and a cylindrical portion connected via connecting means, the connecting means comprising at least one aperture; and
   the sealing cap comprising a flared portion, the flared portion flaring upwards and radially outwards to meet the flared surface to form a seal therewith.

2. The valve assembly of clause 1, wherein the flared portion meets the flared surface at, or adjacent to, the upper rim of the vessel.

3. The valve assembly of any preceding clause, wherein the flared surface comprises an annular valve seat surface, and the flared portion comprises an annular valve face.

4. The valve assembly of clause 3, wherein in a rest position of the valve assembly the annular valve face is biased toward the valve seat surface.

5. The valve assembly of any preceding clause, wherein the sealing cap, connecting means and cylindrical portion form an integral valve element.

6. The valve assembly of clause 5, wherein the valve assembly comprises, and is configured to operate with, two components, the first component comprising the drinking vessel, and the second component comprising the integral valve element.

7. The valve assembly of any preceding clause, the flared portion further comprising flexible, resilient material which, upon the application of suction to the outer rim of the flared portion, is configured to deform and lift from the flared surface to open the valve assembly.

8. The valve assembly of clause 7, wherein the resilient, flexible material is arranged such that, upon the application of suction from a user's lips at a particular point on the outer rim of the flared portion, the outer rim of the flared portion moves away from the vessel inner surface in the vicinity of the particular point, and remains sealed against the inner surface around the remainder of the circumference of the inner surface.

9. The valve assembly of any preceding clause wherein, when the valve assembly is assembled, the valve element is arranged coaxially with, and fits inside, the vessel.

10. The valve assembly of any preceding clause, wherein a flare gradient of the flared portion of the valve element is greater than a flare gradient of the flared surface, such that the flared portion flares upwards and radially outwards to meet the flared surface to form a seal therewith.

11. The valve assembly of any preceding clause, wherein the attachment means comprises one of a screw thread, a bayonet fitting or a push-fit arrangement.

12. The valve assembly of any preceding clause, wherein the cylindrical portion comprises attachment means for removably attaching the valve element to the vessel.

13. The valve assembly of any preceding clause, wherein the flared surface is an inner surface of the vessel.

14. The valve assembly of any preceding clause, wherein the vessel comprises:
　a collar comprising the flared surface and the upper rim; and
　a lower component comprising an interior region for storing fluid.

15. The valve assembly of any preceding clause, the valve assembly further comprising a vessel comprising the flared surface.

16. A valve assembly for allowing a user to drink from any point on a perimeter of a rim of a drinking vessel, the valve assembly comprising:
　a sealing member extending from an inner surface of the vessel, the sealing member comprising an annular valve face surface having an outer rim; and
　a valve element arranged to be removably fixed to the vessel and comprising an outer rim comprising a valve seat,
　wherein, when the valve element is fixed to the vessel:
　　in a rest position, the annular valve face surface is configured to be biased toward the valve seat, and
　　upon the application of pressure from a user's lips to the outer rim of the annular valve face surface, the annular valve face surface is arranged to move away from the valve seat, thus opening the valve.

17. The valve assembly of clause 16, wherein the vessel comprises:
　a collar component comprising the sealing member; and
　a lower component comprising an interior region for storing fluid.

18. The valve assembly of clause 16 or clause 17, wherein the sealing member is arranged coaxially with, and is arranged to fit inside, the vessel.

19. The valve assembly of clause 18, wherein the valve element is arranged coaxially with, and is arranged to fit inside, the vessel and sealing member.

20. The valve assembly of any of clause 16 to 19, wherein the sealing member is fixed to an inner surface of the vessel, optionally around the circumference of the inner surface.

21. The valve assembly of any of clauses 16 to 20, wherein the sealing member is integral with the vessel.

22. The valve assembly of any of clauses 16 to 21, wherein the valve assembly comprises, and is configured to operate with, two components, the first component comprising the vessel and the sealing member, and the second component comprising the valve element.

23. The valve assembly of any of clauses 16 to 22, wherein the valve element is arranged to be removably fixed to the vessel via a screw fit arrangement, and a biasing force between the annular valve face surface and the valve seat can be adjusted by adjusting the screw fit.

24. The valve assembly of any of clauses 16 to 23, wherein the valve face surface flares radially outward.

25. The valve assembly of any of clauses 16 to 24, wherein the vessel rim flares radially outward.

26. The valve assembly of any of clauses 16 to 25, wherein the annular valve face surface is arranged to move from the rest position and away from the valve seat upon the application of direct contact pressure from a user's lips to the outer rim of the annular valve face surface.

27. The valve assembly of any of clauses 16 to 26, wherein the annular valve face surface is comprised of resiliently flexible material, and is biased against the valve seat due to the resilient nature of the material.

28. The valve assembly of any of clauses 16 to 27, wherein the annular valve face surface extends substantially parallel to the vessel in the region of the upper rim of the vessel.

29. The valve assembly of any of clauses 16 to 28, wherein the annular valve face surface comprises resilient, flexible material and is arranged such that, upon the application of pressure from a user's lips at a particular point on the outer rim of the annular valve face surface, the annular valve face surface moves away from the valve seat in the vicinity of the particular point, and remains biased toward the valve seat around the remainder of its circumference.

30. A valve element of a valve assembly for allowing a user to drink from any point on a perimeter of a rim of a drinking vessel, the valve element comprising:
　an outer rim and an annular valve face, the annular valve face being located on a lower surface of the valve element and arranged, when the valve element is attached to the drinking vessel and is in a rest position, to oppose a valve seat surface; and further comprising:
　at least one pivotal protrusion arranged on the lower surface of the valve element between the outer rim and annular valve face such that, upon the application of pressure from a user's lips to the outer rim, the at least one pivotal protrusion contacts the valve seat surface, and the annular valve face moves away from the valve seat surface via a pivoting movement around the at least one pivotal protrusion.

31. The valve element of clause 30, wherein the annular valve face and outer rim are integral and are comprised of resilient, flexible material.

32. The valve element of clause 30 or clause 31, wherein the annular valve face and outer rim are arranged such that, upon the application of pressure from a user's lips at a particular point on the outer rim, the annular valve face moves away from the valve seat surface in the vicinity of the particular point, and remains opposed to the valve seat around the remainder of its circumference.

33. The valve element of any of clauses 30 to 32, wherein the valve seat surface is an inner surface of the vessel.

34. The valve element of any of clauses 30 to 33, wherein the annular valve face is a rounded bead, rib or ridge, which is arranged to roll on the valve seat surface upon the application of pressure from a user's lips to the outer rim.

35. The valve element of any of clauses 30 to 34, wherein the sealing cap is comprised at least in part of resilient and flexible material, and the annular valve face is biased against the valve seat due to the resilient nature of the material.

36. The valve element of any of clauses 30 to 35, wherein the sealing cap is comprised at least in part of resilient and flexible material and at least in part of rigid plastic material.

37. The valve element of any of clauses 30 to 36, further comprising a plurality of pivotal protrusions.

38. The valve element of any of clauses 30 to 37, wherein the valve assembly is configured to operate with two components, the first component comprising the vessel, and the second component comprising the valve element.

39. The valve element of clause 38, wherein, in a rest position, the annular valve face surface is biased toward the valve seat in a biasing direction, and
 upon the application of pressure from a user's lips to the outer rim of the annular valve face surface, the annular valve face surface is arranged to move away from the valve seat in a direction opposed to the biasing direction.

40. The valve element of clause 39, wherein the annular valve face surface comprises resilient, flexible material and is arranged such that, upon the application of pressure from a user's lips at a particular point on the outer rim of the annular valve face surface, the annular valve face surface moves away from the valve seat in the vicinity of the particular point, and remains biased toward the valve seat around the remainder of its circumference.

41. A valve assembly, the valve assembly comprising the valve element of any of clauses 30 to 40 attached to the drinking vessel.

42. The valve assembly of clause 41, wherein the drinking vessel comprises:
 a collar component comprising an inner surface comprising the valve seat surface; and
 a lower component comprising an interior region for storing fluid.

43. A valve assembly or valve element substantially as described herein, with reference to the description and drawings.

44. A computer readable medium having data stored thereon representative of the valve assembly or valve element of any preceding claim, the data being such that it can be relayed to an additive manufacturing device to enable the additive manufacturing device to fabricate the valve assembly based on the data.

The invention claimed is:

1. A valve assembly comprising:
 a vessel configured to receive and hold a fluid, the vessel having an enclosed end and a side wall, where the side wall defines a lip opposite the enclosed end and an inner wall surface of a first diameter, and
 a unitary valve element comprising:
 a baffle having an annular disc with openings for liquid to flow through and the baffle being configured to removably couple the valve element to the vessel, and
 a body fixed to the baffle and comprising a resiliently deformable portion having a central region and a rim, the rim extending outwardly to a second diameter, wherein the second diameter is larger than the first diameter,
 wherein the valve element is configured to couple and release from the vessel as one piece,
 wherein when the vessel and valve element are coupled together at least a portion of the rim of the resiliently deformable portion contacts the inner wall surface of the vessel to form a seal and is deformed substantially inwardly to be located within first diameter of the vessel inner wall surface,
 and further wherein a portion of the rim is configured to lift away from the vessel lip upon application of a suction force to allow passage of liquid between the rim and lip.

2. The valve assembly of claim 1, wherein the rim of the resiliently deformable portion has an outer edge and further wherein the outer edge is not lower than the vessel lip when at least the rim of the resiliently deformable portion is deformed substantially inwardly.

3. The valve assembly of claim 1, wherein the inner wall surface of the vessel comprises an engagement surface and wherein a lower surface of the rim comprises a sealing portion, further wherein the sealing portion provides a sealing abutment with the engagement surface when at least the rim of the resiliently deformable portion is deformed substantially inwardly, and wherein the sealing abutment extends for a predetermined distance down the inner wall surface of the vessel.

4. The valve assembly of claim 3, wherein at least one of the sealing portion and the engagement surface is textured.

5. The valve assembly of any of claim 1, wherein the seal is proximate the lip of the vessel.

6. The valve assembly of claim 1, wherein the body comprising a resiliently deformable portion has a handle projecting upwards from the central region.

7. The valve assembly of claim 1, wherein the body comprising a resiliently deformable portion has a frusto-conical shape extending upwardly and outwardly from the central region.

8. The valve assembly of claim 1, wherein the baffle comprises an axial pin projecting vertically from its upper surface and fixedly connect to the body by molding.

9. The valve assembly of claim 1, wherein the baffle openings are arranged on the perimeter of the annular disc.

10. The valve assembly of claim 9, wherein the inner wall surface of the vessel comprises a circumferential shoulder which projects inwardly from the inner wall and vertical ribs extending down from the lip.

11. The valve assembly of claim 10 wherein once the valve element is inserted into the vessel the annular disc rotatably engages with the circumferential shoulder.

12. The valve assembly of claim 11, wherein the upper surface of the annular disc comprise one or more vertical projections that engage with the vertical ribs to stop further rotation of the annular disc thereby fixing the valve element within the vessel.

13. The valve assembly of claim 1 wherein the resiliently deformable portion includes an air vent.

14. A drinking vessel comprising:
 a cup having an open top, an enclosed end, and a side wall, the side wall comprising a lip opposite the enclosed end, and
 a unitary valve element configured to removably attach to the cup as a single piece, comprising:
 a baffle comprising an annular disc having openings for liquid flow, and
 a body comprising a resiliently deformable portion having a central region and a rim,
 wherein the valve element is configured to be inserted and coaxial with the cup and the rim of the resiliently deformable portion is configured to deform upon contact with the cup to sealingly engage with the inner wall surface to enclose the open top and create a seal against liquid flow, and wherein the rim of the resiliently deformable portion is configured to lift away from the cup upon application of a suction force to create an opening in the seal for liquid to exit.

15. The drinking vessel of claim 14, wherein the rim of the resiliently deformable portion is in the same plane as the vessel lip.

16. The drinking vessel of claim 14, wherein the seal is made between a lower surface of the rim and the vessel inner wall surface.

17. The drinking vessel of claim 14, wherein the seal is located proximate the lip of the cup.

18. The drinking vessel of claim 14, wherein the body comprising a resiliently deformable portion has a handle for grasping.

19. The drinking vessel of claim 14, wherein the body comprising a resiliently deformable portion has a frusto-conical shape extending upwardly and outwardly from the central region.

20. The drinking vessel of claim 14, wherein the cup is unitary.

* * * * *